US010289469B2

(12) United States Patent
Fortino et al.

(10) Patent No.: US 10,289,469 B2
(45) Date of Patent: May 14, 2019

(54) RELIABILITY ENHANCEMENT UTILIZING SPECULATIVE EXECUTION SYSTEMS AND METHODS

(71) Applicant: NVIDIA CORPORATION, Santa Clara, CA (US)

(72) Inventors: Nick Fortino, Santa Clara, CA (US); Fred Gruner, Santa Clara, CA (US); Ben Hertzberg, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 287 days.

(21) Appl. No.: 15/338,247

(22) Filed: Oct. 28, 2016

(65) Prior Publication Data

US 2018/0121273 A1 May 3, 2018

(51) Int. Cl.

| | |
|---|---|
| ***G06F 11/00*** | (2006.01) |
| ***G06F 11/07*** | (2006.01) |
| ***G06F 9/30*** | (2018.01) |
| ***G06F 9/38*** | (2018.01) |
| ***G06F 11/36*** | (2006.01) |

(52) U.S. Cl.

CPC ........ *G06F 11/079* (2013.01); *G06F 9/30174* (2013.01); *G06F 9/3842* (2013.01); *G06F 9/3859* (2013.01); *G06F 9/3863* (2013.01); *G06F 11/0721* (2013.01); *G06F 11/0751* (2013.01); *G06F 11/0793* (2013.01); *G06F 11/36* (2013.01)

(58) Field of Classification Search

CPC .... G06F 9/3842; G06F 9/3859; G06F 9/3863; G06F 9/38

See application file for complete search history.

(56) References Cited

U.S. PATENT DOCUMENTS

| | | | | |
|---|---|---|---|---|
| 5,765,016 A * | 6/1998 | Walker | G06F 9/3836 | 712/217 |
| 6,704,861 B1 * | 3/2004 | McKeen | G06F 9/3842 | 712/215 |
| 8,407,679 B2 * | 3/2013 | Komatsu | G06F 8/45 | 712/226 |

(Continued)

*Primary Examiner* — Marc Duncan
*Assistant Examiner* — Jonathan D Gibson
(74) *Attorney, Agent, or Firm* — Brian Lee; Parker Justiss, P.C.

(57) ABSTRACT

Systems and methods for enhancing reliability are presented. In one embodiment, a system comprises a processor configured to execute program instructions and contemporaneously perform reliability enhancement operations (e.g., fault checking, error mitigation, etc.) incident to executing the program instructions. The fault checking can include: identifying functionality of a particular portion of the program instructions; speculatively executing multiple sets of operations contemporaneously; and comparing execution results from the multiple sets of operations. The multiple sets of operations are functional duplicates of the particular portion of the program instructions. If the execution results have a matching value, then the value can be made architecturally visible. If the execution results do not have a matching value, the system can be put in a safe mode. An error mitigation operation can be performed can include a corrective procedure. The corrective procedure can include rollback to a known valid state.

44 Claims, 20 Drawing Sheets

700

(56) References Cited

U.S. PATENT DOCUMENTS

| | | | | |
|---|---|---|---|---|
| 8,539,163 | B1 * | 9/2013 | Sivasubramanian | G06F 12/0862 709/202 |
| 2004/0237074 | A1 * | 11/2004 | Aronson | G06F 8/4434 717/158 |
| 2007/0234014 | A1 * | 10/2007 | Kobayashi | G06F 9/3824 712/220 |
| 2008/0282064 | A1 * | 11/2008 | Day | G06F 9/5044 712/35 |
| 2009/0063899 | A1 * | 3/2009 | Jordan | G06F 11/10 714/17 |
| 2011/0264862 | A1 * | 10/2011 | Karlsson | G06F 9/3802 711/125 |
| 2011/0296148 | A1 * | 12/2011 | Cain, III | G06F 9/30087 712/228 |
| 2016/0179586 | A1 * | 6/2016 | Wang | G06F 9/528 711/125 |

* cited by examiner

200

210

Performing an instruction parsing process.

220

Preparing native machine instructions for execution.

230

Performing fault checking
(e.g., utilizing speculative execution, etc).

240

Performing an optional error mitigation based upon the fault checking results.

700

710
Converting a program comprising instructions of a high level language are into a plurality of instructions that are native to a processor.

720
Speculatively executes the first code portion and the second code portion to generate respective first results and second results.

730
Comparing the first results against the second results to produce a comparison result.

740
Performing an error mitigation process responsive to a mismatch within the comparison result

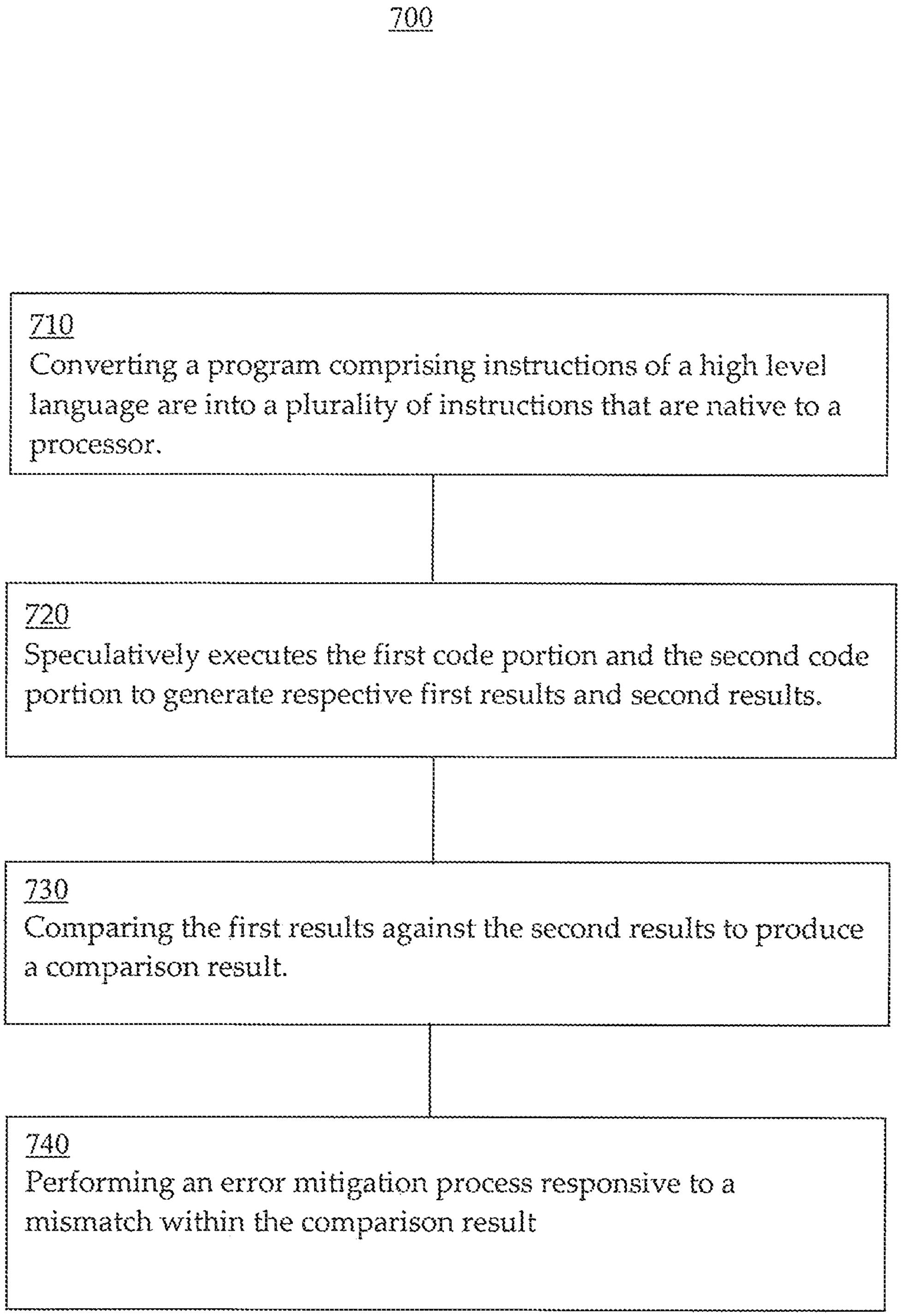

1010
Perform an instruction parsing process.

1020
Performing fault checking utilizing speculative execution.

1030
Architecturally visible values are stored and the storage is also checked for errors.

1040
Performing an error mitigation based upon the fault checking results.

RELIABILITY ENHANCEMENT UTILIZING SPECULATIVE EXECUTION SYSTEMS AND METHODS

FIELD OF THE INVENTION

The present invention relates to error mitigation in electronic systems employing processing. In particular, the present invention relates to a system and method for enhancing reliability utilizing speculative execution.

BACKGROUND OF THE INVENTION

Numerous electronic technologies such as digital computers, video equipment, and telephone systems have facilitated increased productivity and reduced costs in processing information in most areas of business, science, and entertainment. Reliably providing correct results is very often important. For example, accurate analysis of information and system reliability can be critical in a variety of applications (e.g., driving assistance systems, auto pilot systems, financial transaction systems, health related systems, etc.). However, there are a number of factors that can adversely impact the ability of a system to perform reliably (e.g., environmental factors, alpha particle interference, electromagnetic interference, wear and tear on components, hardware defects, etc.). Traditional attempts at ensuring acceptable reliability are often costly and adversely impact performance.

With respect to ensuring or improving execution reliability, traditional approaches are typically directed at either duplicating unshared hardware or duplicating in higher software levels. The duplicate systems (e.g., either in hardware, software, or both) generate results that are compared for reliability. Traditional duplication in hardware usually involves costly additional hardware. Traditional duplication in software usually involves delays and detrimental impacts to performance. Other approaches are needed.

SUMMARY

Systems and methods for enhancing reliability are presented. In one embodiment, a system comprises a processor configured to execute program instructions and contemporaneously perform reliability enhancement operations incident to executing the program instructions. The system also includes a memory configured to store information for the processor. The reliability enhancement operations include fault checking and optional error mitigation. In one exemplary implementation, the fault checking includes: identifying functionality of a particular portion of the program instructions; speculatively executing multiple sets of operations contemporaneously; and comparing execution results from the multiple sets of operations. The multiple sets of operations are functional duplicates of the particular portion of the program instructions. If the execution results from the multiple sets of operations have a matching value, then the value can be made architecturally visible. If the execution results from the multiple sets of operations do not have a matching value, the system can be put in a safe mode. An error mitigation operation can be performed in response to a comparison mismatch in the execution results. The error mitigation operation can include a corrective procedure. The corrective procedure can include rollback to a known valid state.

The multiple sets of operations can correspond to multiple sets of native instructions. In one embodiment, higher level instructions are converted (e.g., translated, decoded, interpreted, combinations thereof, etc.) into a set of native instructions which duplicates the functionality of the higher level instructions. In one exemplary implementation, the memory includes a conversion system that converts ARM architectural code into native machine instructions. The ARM architectural code corresponds to the particular portion of the program instructions. In one embodiment, optimization can be implemented as part of the conversion and creation of the multiple sets of native instructions. In one exemplary, implementation dynamic code optimization (DCO) is performed.

In one embodiment, a reliability enhancement method comprises: performing an instruction parsing process, including determining functionality associated with program instructions; executing the program instructions and contemporaneously performing fault checking incident to executing the program instructions. The method can include preparing native machine instructions for execution and fault checking. The fault checking can include: speculatively executing multiple sets of operations contemporaneously, wherein the multiple sets of operations are functional duplicates of the program instructions; and comparing results from the speculative execution. The resulting value is made architecturally visible if the comparison matches. Error mitigation can be performed in response to a mismatch in the comparison. The error mitigation can include correcting errors if the comparison does not match. In one embodiment, if the comparison matches a value is committed, and if the comparison does not match a rollback to a known valid state is performed.

The reliability enhancement can be applied to a variety of operations. Reliability enhancement fault checking can be applied to load and storage paths. The reliability enhancement can include comparing results of load operations associated with the particular code portion. The reliability enhancement can include comparing input branch values. In one embodiment, values that are made architecturally visible are stored and the fault checking includes checking storage. The storage checking can include: storing an initial storage value from a first register to a first storage location; loading a return storage value back from the first storage location, wherein the return storage value is loaded in a second register; and comparing the initial storage value in the first register and the return storage value in the second register. Additional error mitigation can be performed based on a mismatch in the initial storage value in the first register and the return storage value in the second register.

In one embodiment, a computer readable medium includes instructions encoded thereon that when executed by a processor performs reliability enhancement operations comprising fault checking and optional error mitigation. The operations include conversion and optimization of a particular code portion to produce native machine instructions; and self checking speculative execution of the native machine instructions. The error mitigation is based upon results of the self-checking speculative execution. The conversion and optimization of a particular code portion can include creating multiple instruction streams of the native machine instructions. The multiple instruction streams can include multiple sets of native instructions that are functional duplicates of the particular code portion. The self-checking speculative execution can include speculatively executing the multiple instruction streams contemporaneously and comparing the results. Error mitigation can be performed in response to a comparison mismatch.

In one embodiment, a method of executing a program comprises: converting the program comprising instructions of a high level language into a plurality of instructions that are native to a processor, the plurality of instructions for execution on the processor, wherein a portion of the program is converted into a first code portion of native machine instructions and a second code portion of native machine instructions. The converting can include automatically determining the portion of the program that is converted into a first code portion and second code portion. The first code portion and the second code portion are functionally equivalent to each other and functionality equivalent to the portion of the program. The processor speculatively executes the first code portion and the second code portion to generate respective first results and second results. In one exemplary implementation, the processor substantially contemporaneously speculatively executes the first code portion and the second code portion to generate respective first results and second results. The first results are compared against the second results to produce a comparison result.

An error mitigation process can be performed responsive to a mismatch within the comparison result. In one embodiment, performing an error mitigation process comprises the processor rolling back to a last known commit point of the execution of the plurality of instructions. In one exemplary implementation, performing an error mitigation process comprises the processor generating a fault condition.

The processor can be an in-order execution microprocessor, an out-of-order execution microprocessor, and so on. In one exemplary implementation, the processor comprises a plurality of execution units and the processor speculatively executes the first code portion and the second code portion to generate respective first results and second results. The execution units can operate in parallel to execute the first code portion and the second code portion while the processor is set in a speculative execution mode. The processor can make the results architecturally visible responsive to a match of the comparison result. The portion of the plurality of instructions can be a reliability critical portion of the program. The converting can be performed by a binary translation system. The method can further comprise optimizing the first code portion and the second code portion for execution on the processor.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 7 is a flow chart of an exemplary program execution method in accordance with one embodiment.

DETAILED DESCRIPTION

Figure 1:
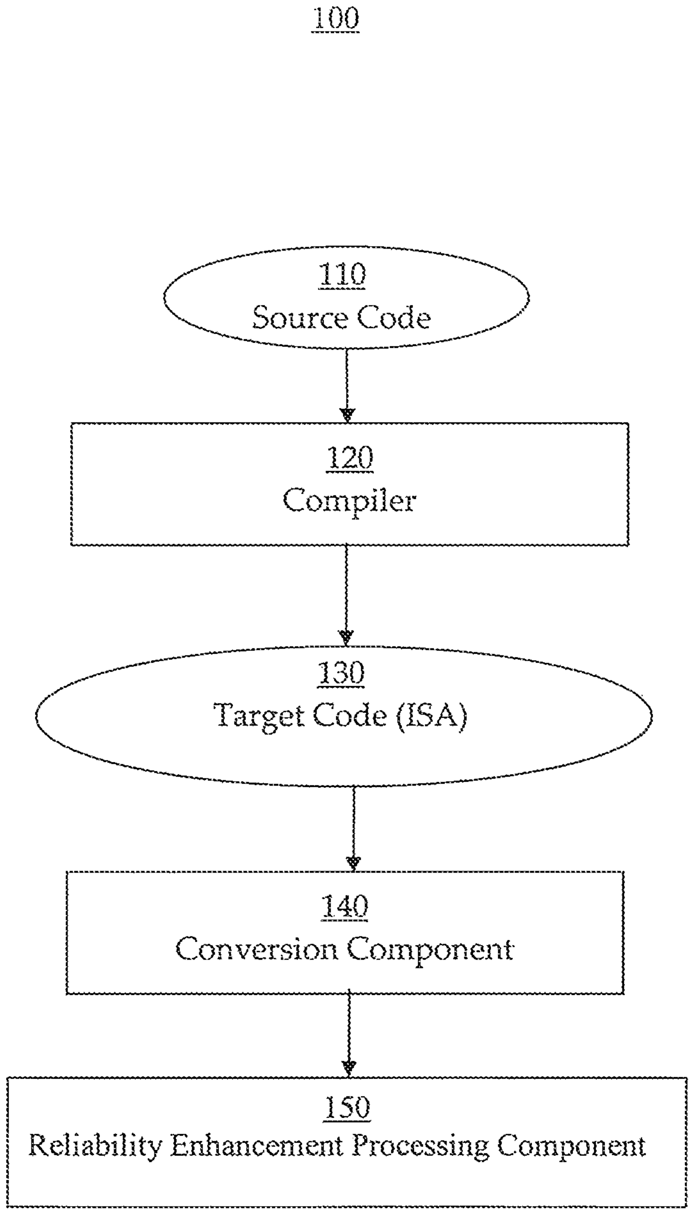
FIG. 1 is a block diagram of an exemplary system in accordance with one embodiment.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

Overview

Systems and methods for improving reliability are presented. The reliability enhancement can be applied to various aspects of the processing (e.g., including executing operations, load operations, storage operations, etc.) and facilitate improvements in various performance measurements (e.g., failure in time (FIT), etc.). The reliability enhancement systems and methods can include automatic implementation of efficient fault checking utilizing speculative execution. In one embodiment, a particular portion of higher level instructions (e.g., critical code, safety related code, etc.) is associated with a functionality which is duplicated by multiple sets of operations that are speculatively executed. The multiple speculative executions can include multiple sets of operations or controls that are considered functional duplicates (even though they may not be exact literal duplicates). In one exemplary implementation, while the multiple sets of operations may perform or achieve similar functionality, they can include directions to load results in different registers (e.g., to allow parallel execution, to enable comparison, etc.). The multiple sets of operations can correspond to multiple sets of native hardware instructions. In one embodiment, the native hardware instructions or microcode are the instructions a processor actually executes.

The results from the speculative execution of the multiple sets of operations are compared. In one embodiment, if the comparison indicates the multiple speculative executions result in values that are not the same or do not match, the resulting values are not made architecturally visible. In one exemplary implementation, non matching results can trigger various error mitigation operations (e.g., a rollback to the last valid commit state, forward a notification of the error, additional fault analysis, fault handler, etc.). If the comparison indicates the multiple speculative executions result in values that are the same or match, the matching value or result can be made architecturally visible within the system. Making the result architecturally visible can include forwarding the value to a commit stage.

It is appreciated that the multiple sets of operations associated with duplicating a functionality can be created or introduced through various mechanisms. In one embodiment, the creation or introduction of multiple sets of operations associated with duplicating a functionality can be implemented as part of the generation or formation of native hardware instructions or microcode. In one exemplary implementation, the generation or formation of the native hardware instructions includes a binary input (e.g., logical ones and zeroes, high and low voltages, etc.) that is utilized at the base machine or hardware level. In one exemplary implementation, the generation or formation can be associated with converting (e.g., decoding, interpreting, translating, etc.) non-native instructions into native hardware instructions. In one embodiment, the generation or formation of native hardware instructions or microcode involves Instruction Set Architecture (ISA) level instructions. The ISA level instructions can be native ISA instructions or non-native ISA instructions. There can be intermediate processing to convert between non-native ISA instructions and native ISA instructions.

It is appreciated that the reliability enhancement can be utilized to achieve a variety of objectives. In one embodiment, the reliability enhancement facilitates improved failure in time rate (FIT) management by identifying and correcting otherwise erroneous results. The reliability enhancement can also be utilized to facilitate identification of hardware problems. The reliability enhancement can be expanded to storage operations and facilitate identification and correction of storage problems.

FIG. 1 is a block diagram of exemplary system 100 in accordance with one embodiment. System 100 includes source code 110, compiler 120, target code 130, conversion component 140, and reliability enhancement processing component 150. Source code 110 can include various user programmed code in various languages (e.g., FORTRAN, C++, Java, etc.). Compiler 120 compiles or translates source code 110 into target code 130. Target code 130 can include various architecture instructions (e.g., ARM instructions, CISC instructions, etc.). Conversion component 140 determines if target code is in a native machine instruction format or non-native format and converts (e.g., translates, decodes, etc.) non-native instructions into native machine instructions. Reliability enhancement processing component 150 performs processing in a manner that facilitates fault checking and error mitigation seamlessly. The reliability enhancement can be performed without the knowledge of the upper levels of the architecture (e.g., at the application level, program level, etc.) and without the need for the upper levels to make adjustments. In one embodiment, the upper levels can indicate they would like fault checking and error mitigation performed by a simple notification without having to make changes to the upper levels or ensure additional hardware is available to perform the mitigation.

In one embodiment, the reliability enhancement includes performing operations that duplicate a functionality and comparing the results. If the comparison indicates a match, the matching result or value is accepted as good or valid. If the comparison results do not match, various mitigation operations can be implemented (e.g., rolling back to a known valid or good state and trying again, etc.). In one exemplary implementation, faults or mismatch occurrences are reported and tracked and additional analysis is performed (e.g., detecting hardware component failures etc.).

Figure 2:
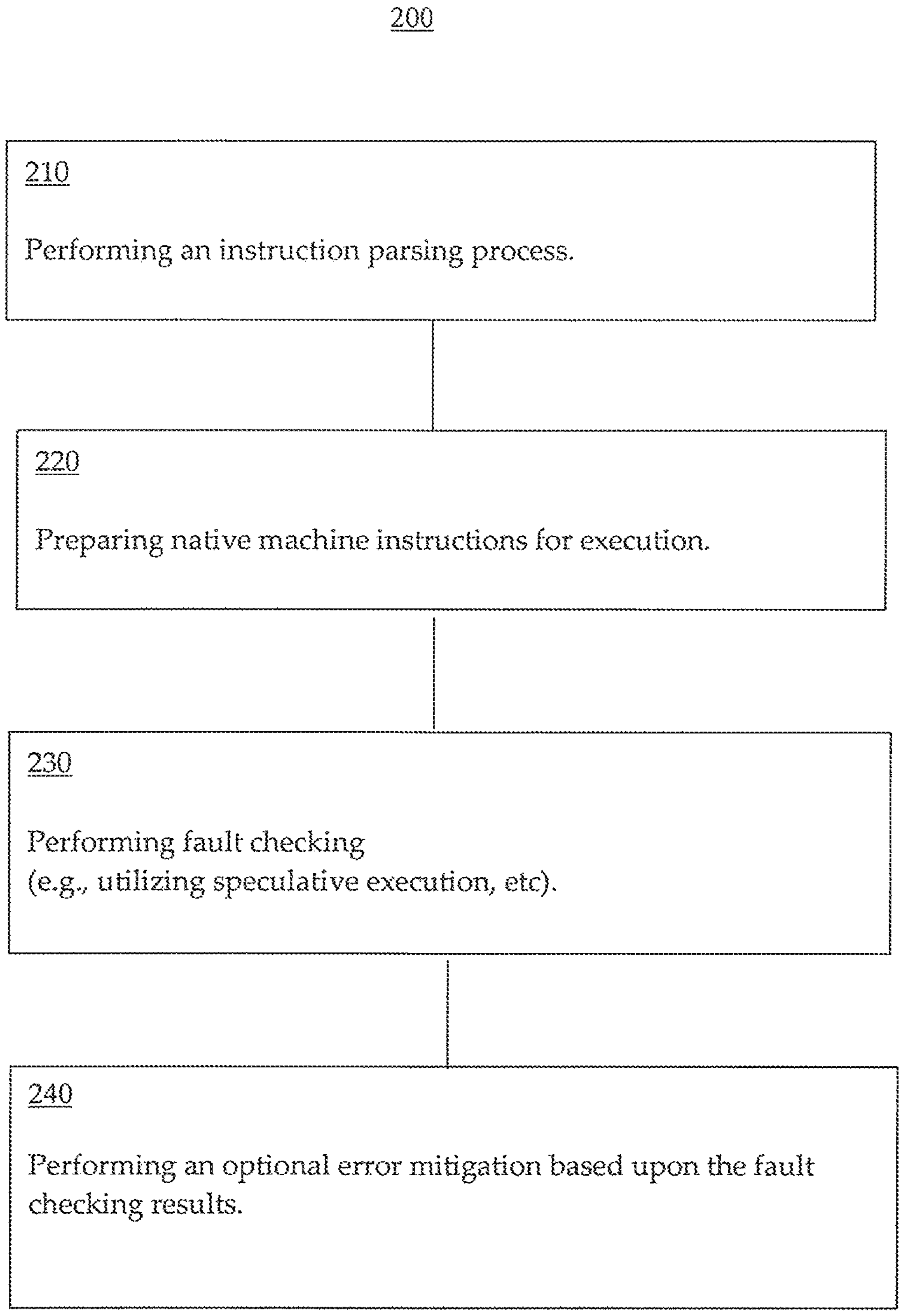
FIG. 2 is a block diagram of an exemplary computer implemented error mitigation method in accordance with one embodiment.

FIG. 2 is a block diagram of reliability enhancement method 200 in accordance with one embodiment.

In block 210, an instruction parsing process is performed. In one embodiment, instructions are received or accessed and parsed to determine a corresponding functionality. The received instructions can be higher level language instructions. In one exemplary implementation, the functionality is associated with a portion or block of instructions. The parsing can be directed at op-codes, operands, addressing modes of instructions, and so on.

In block 220, native machine instructions are prepared for execution. In one embodiment, a conversion process determines if target code is in a native or non-native format and converts (e.g., translates, decodes, combinations thereof, etc.) non-native instructions into native machine instructions. The results of the conversion process include a first set of native machine instructions that are capable of implementing a parsed functionality from block 211. In one exemplary implementation, a duplication process can create a second set of native machine instructions that are also capable of implementing the parsed functionality from block 211.

In block 230, operations associated with the sets of native machine instructions are performed or executed and incident to performing the operations a fault checking process is performed. The type of fault checking that is performed can depend upon the type of operations that are associated with the functionality (e.g., an execution operation, a storage operation, etc.). The operations can be speculatively executed. In one embodiment, the fault checking of an operation includes contemporaneously performing operations that duplicate the functionality and comparing the results. If the comparison indicates a match, the matching result or value is accepted as good or valid and made architecturally visible. If the comparison results do not match, the process is put in a safe mode. In one embodiment, putting the process in a safe mode can include proceeding to block 240.

In block 240, error mitigation is optionally performed. Various mitigation operations can be implemented and can depend upon the type of operations that are associated with the functionality (e.g., an execution operation, a storage operation, etc.). In one embodiment, the mitigation operations associated with speculative execution can include rolling back to a known valid or good state and trying again.

Mitigation operations associated with a storage operation can include error correcting code (ECC) operations. In one exemplary implementation, mismatch occurrences are tracked and additional analysis is performed (e.g., detecting hardware component failures, etc.).

Figure 3:
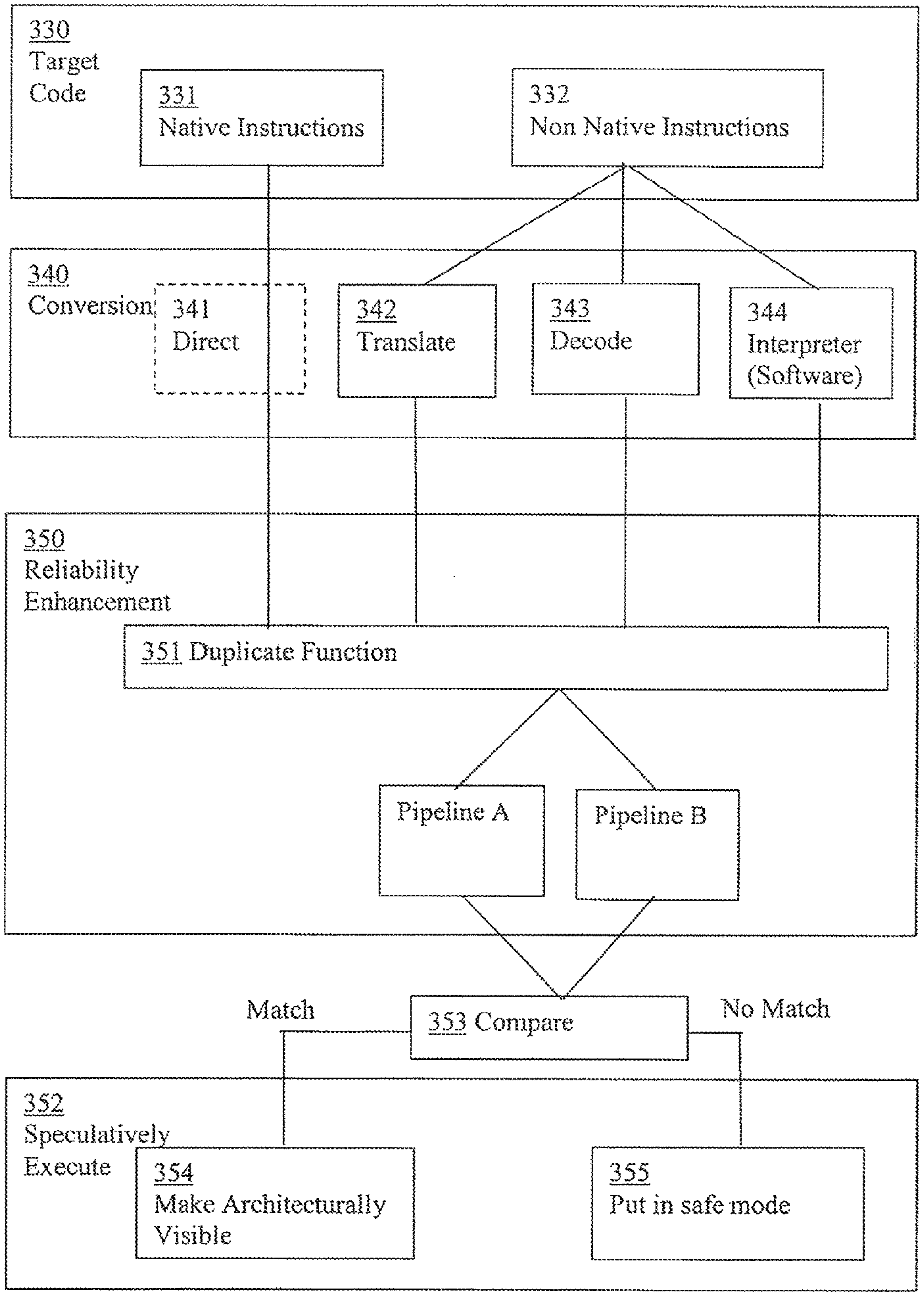
FIG. 3 is a block diagram of process flow in accordance with one embodiment of a reliability enhancement method.

FIG. 3 is a block diagram of process flow in accordance with one embodiment of a reliability enhancement method. Target code 330 is received and includes native machine instructions 331 and non-native instructions 332. In one embodiment, target code 330 is similar to target code target code 130 and can include various architecture instructions (e.g., ISA instructions, ARM instructions, CISC instructions, etc.). In block 340, a conversion process determines if portions of target code 330 are in a non-native or native machine instruction format and converts non-native instructions into native machine instructions. In one embodiment, the conversion is performed by hardware. Native instructions 331 are in a native machine instruction format and are forwarded directly for reliability enhancement processing. With regards to non-native instructions 332, the conversion process 340 determines a conversion process to use (e.g., such as translation process 342, decoding process 343 or interpretation process 344, etc.) and converts (e.g., translates, decodes, etc.) the non-native instructions 332 into native machine instructions. The native machine instructions are directed at performing a similar functionality as the non-native instructions. The native machine instructions are forwarded for reliability enhancement processing in block 350. In block 351, the native machine instructions are arranged to direct multiple sets of operations that duplicate the functionality during speculative execution process 352. In one embodiment, a first set of machine code instructions from conversion block 340 corresponding to a functionality is received by duplicate block 351 which creates a second set of machine code instructions that duplicate the functionality. In one exemplary implementation, native hardware instructions are functionally duplicated by hardware (e.g., a splitter, a scheduler, etc.).

In one embodiment, a first set of operations that duplicates the functionality are executed in pipeline A and a second set of operations that duplicate the functionality are executed in pipeline B. The results of the speculative executions are compared in block 353. If the speculative execution results match the result value is made architecturally visible in block 354. In one embodiment, the matching result value is committed. If the speculative execution results do not match the system is put in a safe mode in block 355. The safe mode can include a rollback. In one exemplary implementation, the safe mode includes an optional error mitigation process.

Speculative Execution of Duplicate Functionality

In one embodiment, speculative execution is a process of performing a set of operations and if results are appropriate the process moves forward, if the results are not appropriate the process can be put in a safe mode. The safe mode can include putting the process back in a valid condition or state (e.g., rollback to previous state, jump to another known valid state, stop operations, etc.). In one exemplary implementation, the speculative execution is a self checking speculative execution that checks for faults or errors. The speculative execution data can be "hidden" from the architecture and other operations. The architecture and other operations are unaware of the speculative execution results until reliability is established. After reliability is established the results can be committed or be made architecturally visible. In one exemplary implementation, operations performed out of order are considered speculative execution.

In one embodiment, the commit and rollback functions are fundamentally hardware mechanisms in so far as the hardware saves the states and restores the states when a rollback is performed. The presented systems and methods strongly leverage the fact that the hardware supports speculative execution and trying again if needed. In one exemplary implementation, the hardware issues a compare fault instruction if there is a fault condition such as a mismatch in the comparison. The compare fault instruction can include operations that are to be performed in response to a fault condition. The compare fault instruction can be used to go back to a prior commit point that is known to be valid. In one embodiment, an ordinary compare is performed and if there is a mismatch the compare fault instruction initiates a branch to a handler or interrupt. The exact form of the speculation is not limited. The reliability enhancement process is compatible with many forms of speculation and machines.

Figure 4:
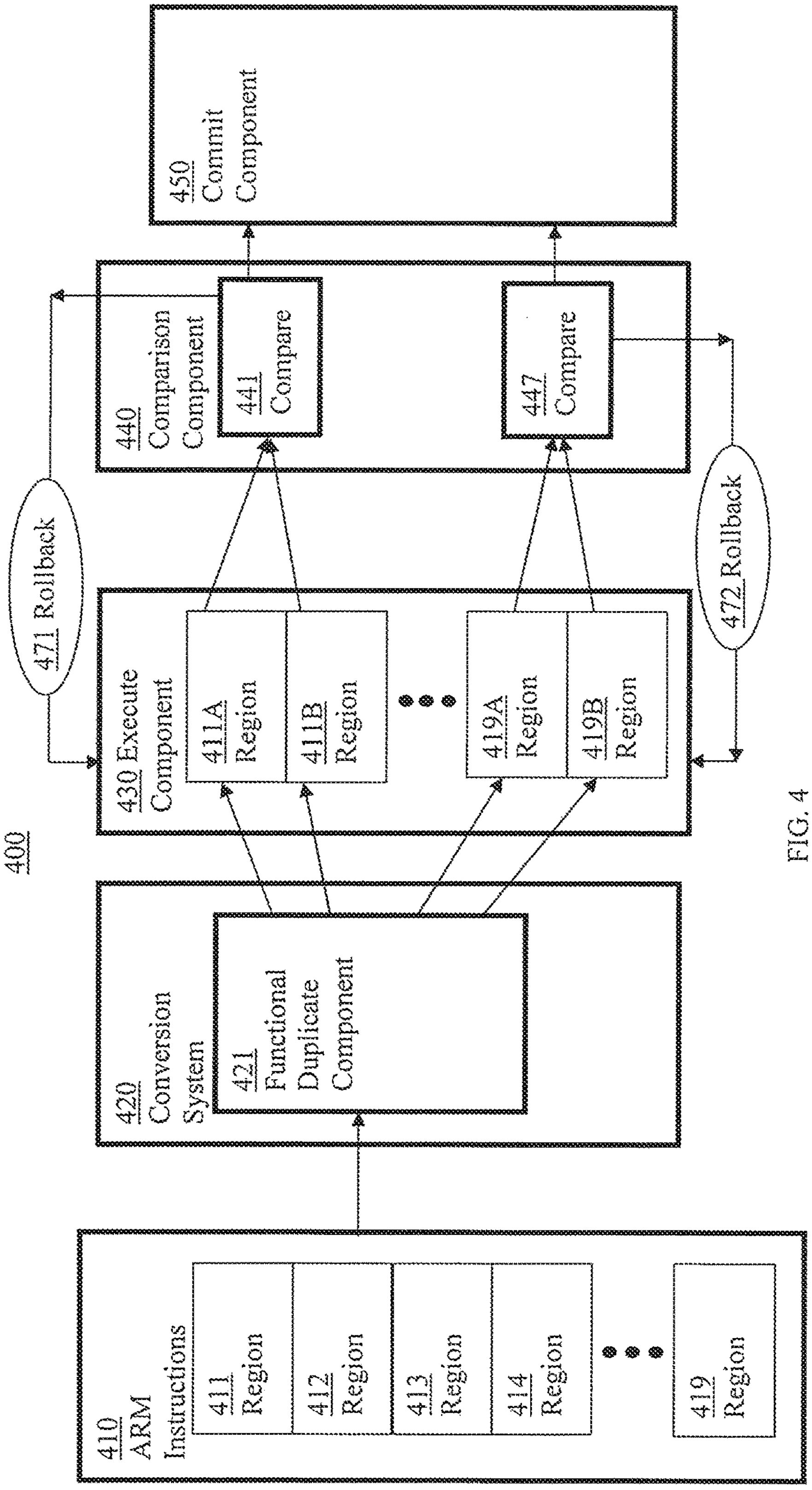
FIG. 4 is a block diagram of an error mitigation system in accordance with one embodiment.

FIG. 4 is a block diagram of reliability enhancement system 400 in accordance with one embodiment. ARM instructions 410 are received and divided up into code portions 411, 412, 413, 414, and 419. In one embodiment, the ARM instructions are similar to the target code 130. The code portions are forwarded to conversion component 420. The conversion component 420 determines if the ARM instruction portions are in a native machine format and converts ARM instruction portions that are in non native machine format into native machine instructions. The conversion component 420 can include a functional duplicate component 421 that creates multiple functional duplicates in the native machine language or micro code. For example, the functionality of higher level instruction code portion or region 411 is converted and forwarded to execution component 430 as duplicate native machine instruction portions or regions 411A and 411B. In one embodiment, native machine instruction portions or regions 411A and 411B implement the same functionality when executed. Similarly, region 419 is converted and duplicated in regions 419A and 419B. The native machine instruction regions are speculatively executed by execution component 430 (e.g., in a processor, etc.) and the results are forwarded to comparison component 440. The execution can be done substantially in parallel. In one exemplary implementation, comparison component 440 includes comparison logic 441 and 447. Comparison logic 441 compares results of 411A and 411B. Comparison logic 447 compares results of 419A and 419B. If the comparison indicates the results match, the respective value is forwarded to a commit component 450 (e.g., commit buffers, commit registers, etc.). If the comparison indicates the results do not match the process is rolled back to the last valid commit point and execution component 430 performs the execution again, or some other error mitigation can be taken.

Figure 5:
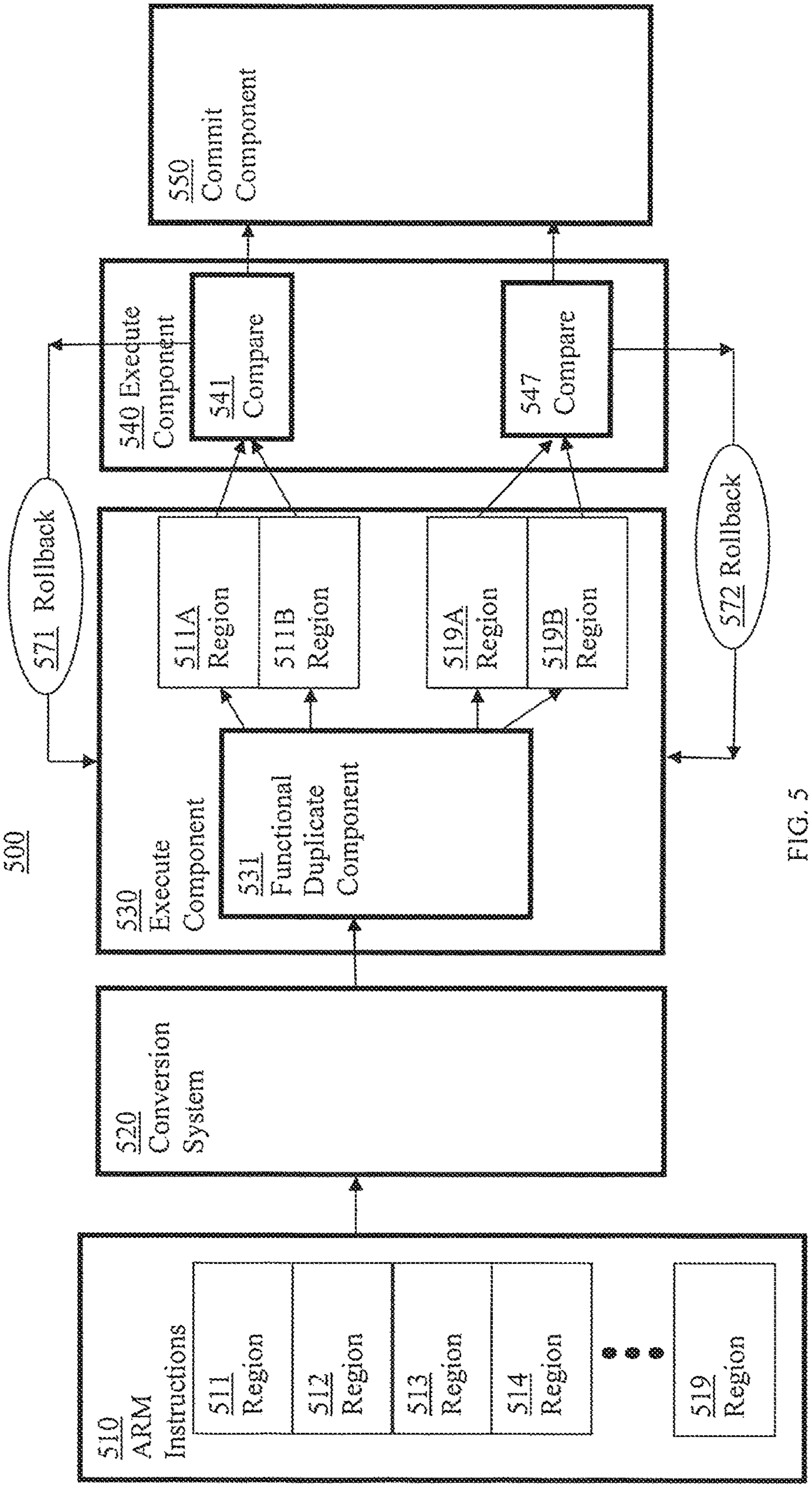
FIG. 5 is a block diagram of an error mitigation system in accordance with one embodiment.

FIG. 5 is a block diagram of a reliability enhancement system 500 in accordance with one embodiment. Error mitigation system 500 is similar to error mitigation system 400 except the functional duplication is performed in the execution component in error mitigation system 500. ARM instructions 510 are received and divided up into code portions 511, 512, 513, 514, and 519. The code portions are forwarded to conversion component 520 and converted into native machine instructions. The conversion component 520 determines if the ARM instruction portions are in a native machine format and translates non-native portions into native machine instructions. The native machine instructions are forwarded to execution component 530 for execution. The execution component 530 includes a functional duplicate component 521 that directs multiple sets of operations that functionally duplicate the native machine instructions or micro code. In one exemplary implementation, the functional duplicate component 521 creates multiple sets of the native machine instructions or micro code that are functional duplicates or copies. For example, the functionality of higher level instruction code portion or region 511 is converted as duplicate native machine instruction portions or regions 511A and 511B. In one embodiment, native machine instruction portions or regions 511A and 511E implement similar functionality when executed. Similarly region 519 is converted and duplicated in regions 519A and 519B. The speculative execution results are forwarded to comparison component 540 (which can include comparison logic 541 and 547). If the comparisons indicate the respective speculative execution results match, the value is forwarded to a commit component 550. If the respective speculative execution results do not match, the process is rolled back to the last valid commit point and execution component 530 performs the execution again. Alternatively, some other error mitigation action can be taken.

In one embodiment, a set of operations can correspond to a set of native machine instructions (e.g., machine code, microcode, binary code, etc.). An instruction parsing and conversion process can include automatically preparing or creating multiple sets of native machine instructions that are functional duplicates of a higher level code portion. A conversion system can automatically create or generate the functional duplicate native hardware instructions. The conversion system receives higher level code (e.g., instructions that are not native to hardware, instructions that are not directly executable by hardware, etc.) and converts it into native hardware instructions. In one exemplary implementation, native hardware instructions are received and are directly executable by hardware and do not need further conversion (e.g., translation, decoding, interpretations, etc.). Fault checking can include speculatively executing the duplicate functionality based on the multiple sets of native machine instructions. The speculative executions start from a known valid or good state and proceed down the speculative path.

In one embodiment, conversion includes binary translation. In one exemplary implementation, a dynamic binary translator can be used for hot code speculative execution. The hot code speculative execution can include fault checking and error mitigation operations.

Figure 6:
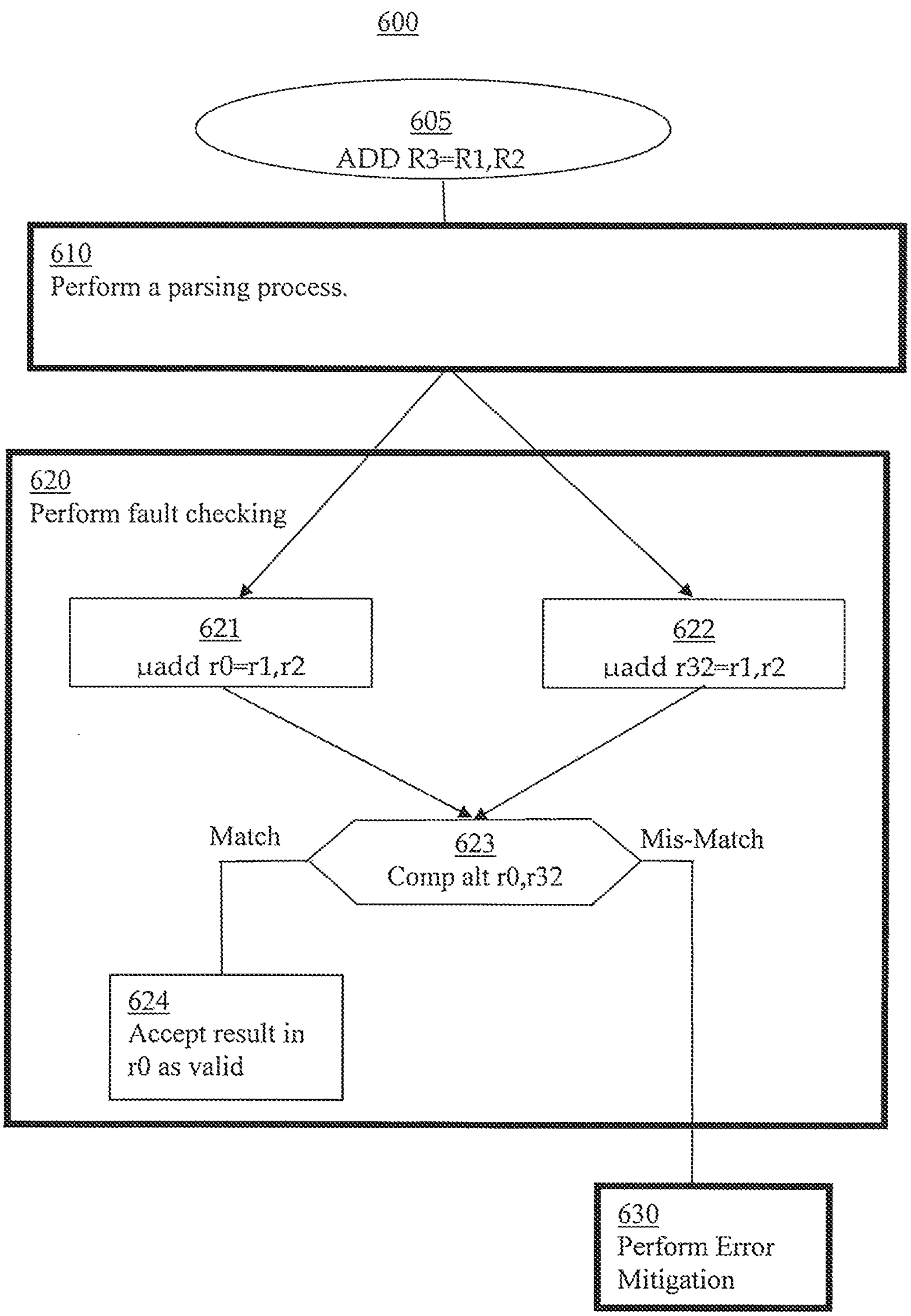
FIG. 6 is a flow chart of an exemplary computer implemented reliability enhancement method in accordance with one embodiment.

There are a variety of functions that can be implemented. The functionality can include mathematical operations, such as addition, multiplication, division, and so on of various values. The functionality can include logical operations such as logical OR, logical AND, and so on of various inputs. FIG. 6 is a flow chart of an exemplary reliability enhancement method 600 in accordance with one embodiment. Reliability enhancement method 600 is used to enhance the reliability of execution operations associated with a higher level code portion. Block 605 is an example of a higher level code portion associated with a particular functionality. The higher level code portion is received or accessed and a parsing process is performed in block 610. In one embodiment, the parsing process performed in block 610 is similar to the parsing process performed in block 210. The parsing process includes identifying the particular functionality associated with the higher level code portion. In one exemplary implementation, the particular functionality is an ADD in which a value in register R1 is added to a value in register R2 and the result is loaded in register R3.

In one embodiment, the parsing in block 610 includes preparing native machine instructions for execution similar to block 220. The preparation of native machine instructions can include determining if received or accessed instructions are in a native machine instruction format and if not, converting non-native machine instructions into native machine instructions. The resulting native machine instructions direct corresponding sets of operations (e.g., in block 621, 622, etc.).

In block 620, a fault checking process is performed. In one embodiment, multiple sets of operations corresponding to the particular functionality are speculatively executed. It is appreciated that there can be more than two duplicate speculative executions of the functionality, which can also increase the likelihood of identifying errors. The speculative executions can occur substantially simultaneously. Each set of operations is a functional duplicate of the higher level code portion functionality. Block 621 is an example of a first set of speculatively executed operations in which a value in register r1 is added to a value in register r2 and the result is loaded in register r3. Block 622 is an example of a second set of speculatively executed operations in which a value in register r1 is added to a value in register r2 and the result is loaded in register r32. Block 623 is an example of a compare of the value in register r3 and register 32. If the comparison results in a match, the process proceeds to block 624 and the value in register r3 is accepted as valid. In one embodiment, a valid value in register r3 is made architecturally visible and the process proceeds to another set of instructions (until the program is complete). In one exemplary implementation the result is committed. If the comparison results in a mismatch the process proceeds to block 630 and error mitigation is performed. The error mitigation can include a rollback to a last know valid state. The process can repeat again from the last known valid state.

As the periods of execution increase there is an increased vulnerability to alpha particle interference and speculative execution fault checking and error mitigation can be very helpful. In one embodiment, it is highly unlikely that an error will occur exactly the same way multiple times and produce exactly the same erroneous values multiple times for inputs to the compare. Thus, by duplicating the functionality in multiple sets of operations that are speculatively executed it is likely the compare will detect the occurrence of a fault. In addition, there is a reasonable expectation that rolling back to a valid state and repeating the operations can correct the problem. The rollback execution can be performed in a manner that is less speculative and has a higher probability of being successful. In one embodiment, execution faults are considered both detectable and correctable by speculative execution fault checking and error mitigation.

FIG. 7 is a flow chart of an exemplary program execution method 700 in accordance with one embodiment. In one exemplary implementation the program execution method 700 includes executing program instructions and reliability enhancement operations. The reliability enhancement operations can include fault checking and error mitigation. It is appreciated program execution method 700 can be implemented on a variety of processors (e.g., an in-order execution microprocessor, an out-of-order execution microprocessor, etc.). The processor can include a plurality of execution units.

In block 710, a program comprising instructions of a high level language are converted (e.g., translated, decoded, interpreted, etc.) into a plurality of instructions that are native to a processor. The plurality of instructions can be executed on the processor. In one exemplary implementation, a portion of the plurality of instructions is a critical reliability portion of the program.

In one embodiment, a portion of the program is converted into a first code portion of native machine instructions and a second code portion of native machine instructions. The first code portion and the second code portion are functionally equivalent to each other and functionally equivalent to the portion of the program. The converting can comprise optimizing the plurality of instructions for execution on the processor. The converting can comprise automatically determining which of the plurality of instructions is to be converted.

In block 720, the processor speculatively executes the first code portion and the second code portion to generate respective first results and second results. The speculative execution of the first code portion and the second code portion can be substantially contemporaneous. In one exemplary implementation, a plurality of execution units operating in parallel can execute the first code portion and the second code portion while the processor is set in a speculative execution mode.

In block 730, the first results are compared against the second results to produce a comparison result. If the first results and second results match then the first result is accepted as valid or good. In one embodiment, the processor makes the results architecturally visible responsive to a match of the comparison result.

In block 740, an error mitigation process is performed responsive to a mismatch within the comparison result. In one embodiment, performing the error mitigation process comprises the processor rolling back to a last known valid or commit point of the execution of the plurality of instructions. Performing an error mitigation process can comprise the processor generating a fault condition.

In one embodiment, speculative execution fault checking is considered "free" in that adverse impacts to performance and cost are minimal or non existent. In one exemplary implementation, the fault checking does not appreciable decrease performance speed or adversely impact timing as the speculative execution happens within limitations of the original programming critical path. The fault checking does not make the critical path timing appreciably longer between commit points in one exemplary implementation as compared to just executing one version of the original code without fault checking speculative execution. The fault checking has little or no appreciable adverse impact on the commit timing associated with commit points on a critical path. Furthermore, the fault checking does not introduce additional or new stalls to memory. With regards to cost, in one exemplary implementation the fault checking does not need additional dedicated duplicate hardware.

Differences from Traditional Approaches

Figure 8:
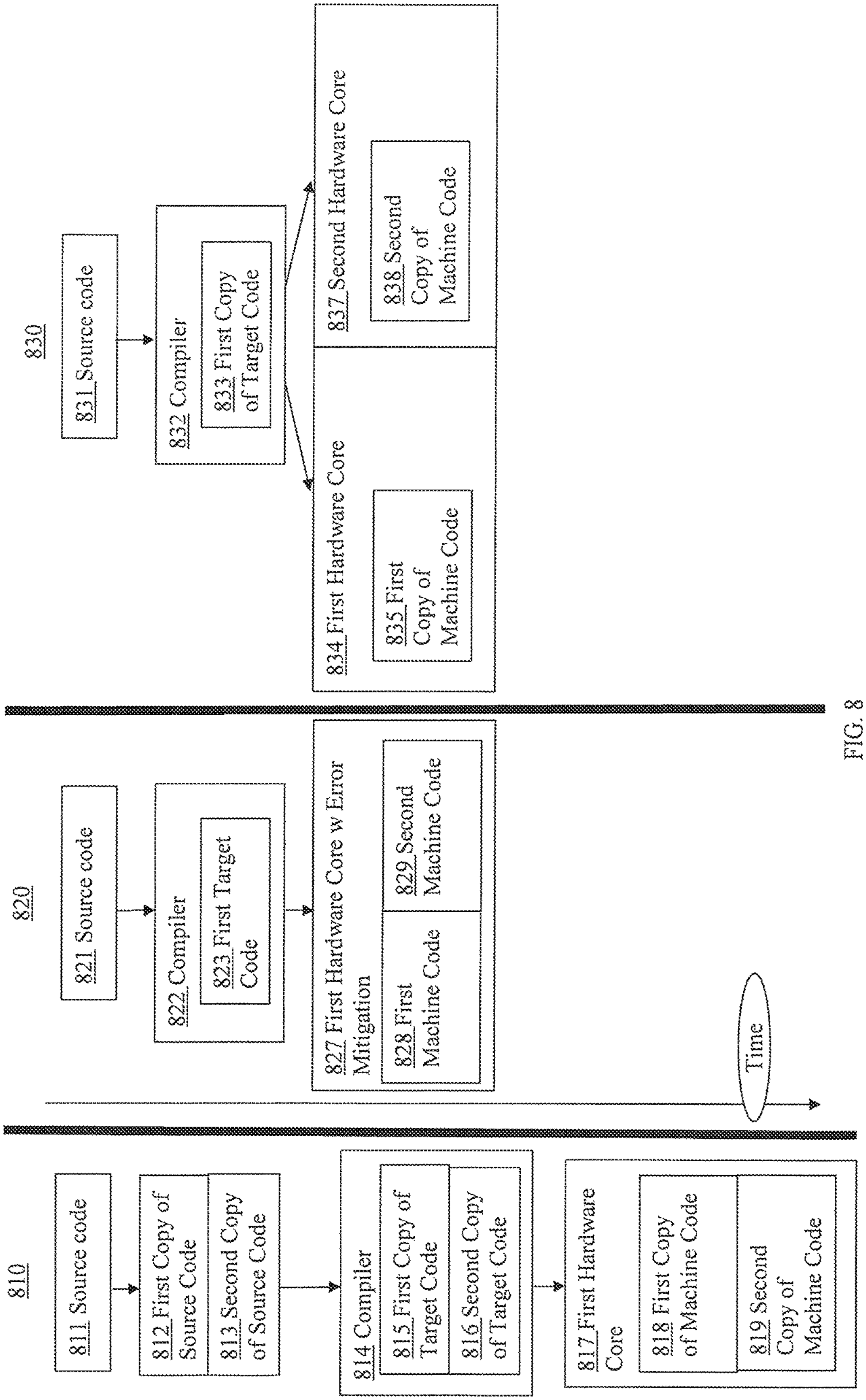
FIG. 8 is a block diagram comparison of conventional pipeline attempts versus an exemplary efficient error mitigation pipeline in accordance with one embodiment.

With reference back to FIG. 8, a block diagram comparison of conventional pipeline attempts 810 and 830 versus an efficient reliability enhancement pipeline 820 in accordance with one embodiment is illustrated.

In conventional duplication attempt 810, source code 811 is received and there is a duplicate in software to produce first copy of source code 812 and second copy of source code 813. While this may appear to be a simple procedure to duplicate the source code, in reality it often traditionally takes considerable coordination and effort by the programmers. Compiler 814 compiles or translates source code copies to sequentially generate first target code 815 (corresponding to first copy of source code 812) and second target code 816 (corresponding to second copy of source code 813). The compiler forwards the code to first hardware core 817. First hardware core 817 interprets the code from compiler 814 and creates first copy of machine code 818 and second copy of machine code 819 based on first target code 815 and second target code 816, respectively. First hardware core 817 then executes the code sequentially. Even if the compiler translates source code directly into machine code, the translation and executions are still performed sequentially, approximately doubling the execution time, thereby adding unwanted delay.

Even if a traditional duplicate in software approach attempts to shorten the timeline by using additional hardware for execution of the first copy of machine code 818 and second copy of machine code 819 (e.g., duplicate hardware, etc.) it does not help alleviate many of the problems associated with the traditional duplicate in software approach. A duplicate hardware of first hardware core 817 does not shorten the timeline of conventional duplication attempt 810 much. Creating the copies of the source code (e.g., first copy of source code 812, second copy of source code 813, etc.) and generating the target code (e.g., first target code 815, second target code 816, etc.) still takes time. Furthermore, traditional attempts that involve using more hardware cores (e.g., in addition to the first hardware core 817, etc.) typically consume additional resources. The adverse impacts and consumption of resources illustrated in the duplicate in hardware conventional duplication attempt 830 would similarly impact duplication attempt 810 if a second duplicate hardware core (not shown) was added beside first hardware core 817 to execute the second copy of machine code 819.

A traditional duplicate in hardware approach is illustrated in conventional duplication attempt 830, which includes two costly and resource consuming hardware cores. Source code 831 is received and compiler 832 compiles or translates the source code and generates first copy of target code 833 corresponding to the first copy of source code 831. The compiler forwards the code to duplicate in hardware components 834 and 837. The first hardware core 834 interprets the target code 833 from compiler 832 and creates first copy of machine code 835 and then executes the code. Similarly, the second hardware core 837 interprets the target code 833 from compiler 832 and creates a second copy of machine code 838 and then executes the code. The multiple hardware cores can have a variety of characteristics and features associated with traditional duplicate in hardware schemes. The traditional duplicate in hardware schemes can include: separate cores with a common point out in memory; two separate cores that share second level cache; software that duplicates or copies the code and two different cores that run the copies independently; multiple dual lock step processor cores that run the same code on a clock by clock basis and compare a set of signals every cycle to make sure that everything is identical; and so on. Unfortunately, the use of two cores in traditional duplicate in hardware approaches approximately doubles the amount and cost of hardware.

The reliability enhancement approach 820 in accordance with one embodiment of the present invention is more efficient and effective than either of the conventional duplication attempts 810 and 830. Reliability enhancement approach 820 does not take as much time as conventional duplication attempt 810 and does not involve significant strain or inconvenience on the programmers of the source code. Reliability enhancement approach 820 does not require as many costly resources as conventional duplication attempt 830. Source code 821 is received and easily compiled or translated into first target code 823. First target code 823 can be an architectural level code (such as ARM instructions, CISC instructions, etc.). In one embodiment, unlike the conventional approaches there is no need for concern or expenditure of resources on fault checking or error mitigation up to this point. Compiler 822 forwards first target code 823 to first hardware core with error mitigation 827. First hardware core with fault checking and error mitigation 827 speculatively executes the first native machine instructions 828 and second native machine instructions 829 which are functionally similar. In one embodiment, operations associated with native machine instructions code 828 are considered a first stream and operations associated with second native machine instructions 829 are considered a second stream. In one embodiment, the first hardware core with fault checking and error mitigation 827 can implement the first native machine instructions 828 and second native machine instructions 829 substantially in parallel in a single hardware core, unlike the time consuming sequential operations of conventional duplication attempt 810 and the expensive second hardware core of conventional duplication attempt 830.

Conventional duplicate in software operations often include updating internal states, which can cause problematic issues. Conventional duplicate in software approaches typically require manual restructuring of a lot of code and programmers or users have to rewrite the algorithms in order to overcome the problematic issues. Generally, the conventional duplicate in software code is not structured to easily undo problems or perform rollbacks. Essentially discarding or throwing away a whole bunch of code and starting over when invalid or unreliable data is encountered is not often practical for conventional duplicate in software approaches. One reason it may not be practical is because other operations may have overwritten the original input data that is needed to roll back or start over.

The reliability enhancement self checking speculative execution includes automatic duplication of the functionality as well as automatic insertion of the check or comparison. In one embodiment, the self-checking speculative execution is transparent to a user and higher level programs. The higher level program or application can be run in a reliability enhancement speculative execution manner without having to manually rewrite the software or program code. The speculative execution waits to overwrite or destroy the input value until the reliability of the produced or resulting outputs is confirmed. In addition, the ability of the reliability enhancement operations to be flexibly scheduled and executed also facilitates increased performance over conventional duplicate in software approaches. In one embodiment, an application can indicate that reliability enhancement is to be performed for particular portions of application code, but the application is unaware of the implementation details at lower levels (e.g., speculative execution operations, error mitigation, scheduling, coordination, etc.).

The reliability enhancement can be initiated by a variety of triggers. In one embodiment, a reliability enhancement speculative execution mode is triggered for a particular code portion. In one embodiment, a page table attribute can be associated with the particular code portion and used to trigger the speculative execution. In one exemplary implementation, a visible register is used to facilitate setting the machine into the speculative execution mode.

Figure 9:
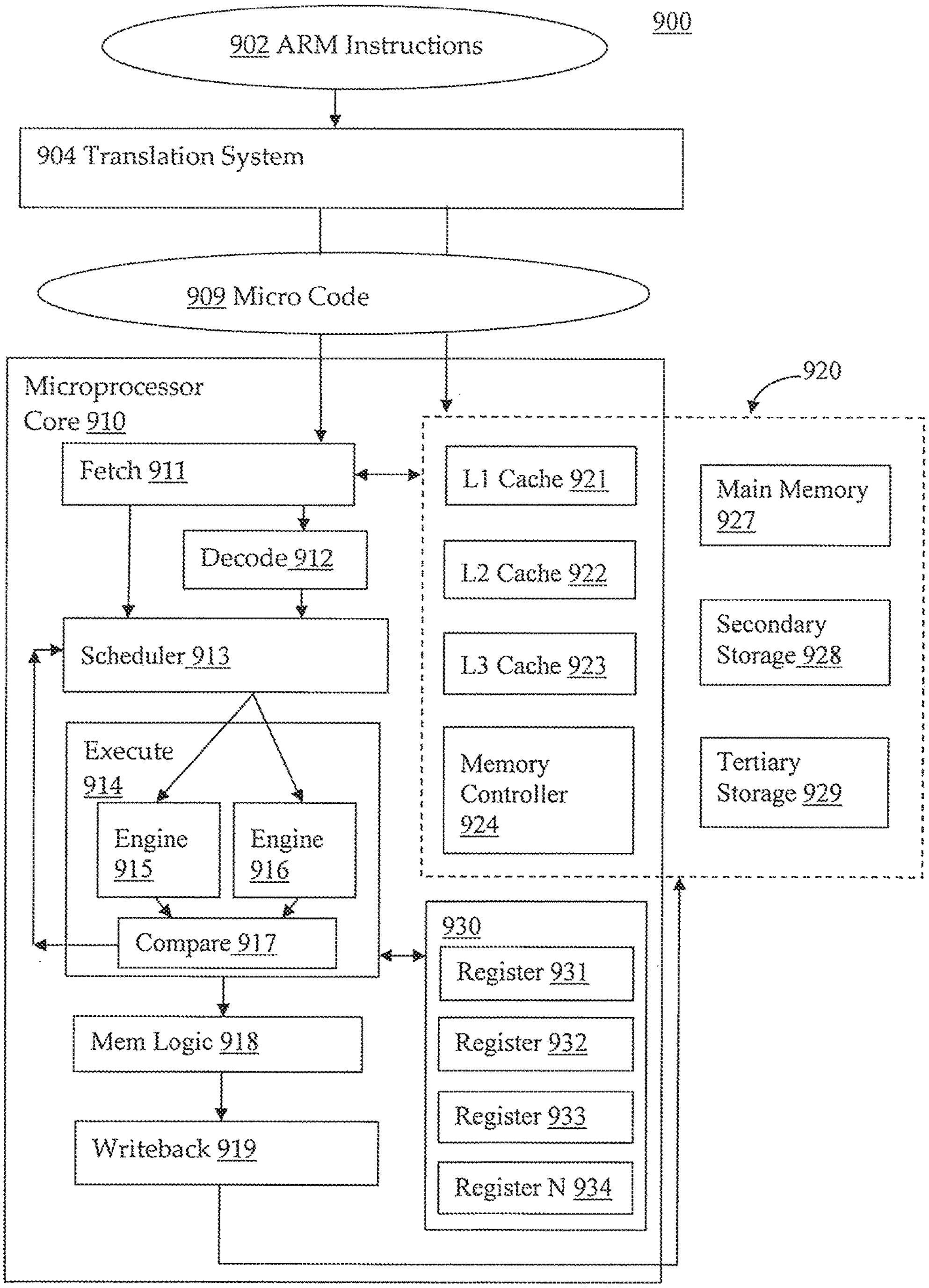
FIG. 9 schematically depicts a micro-processing system in accordance with one embodiment.

It is appreciated that the order in which transactions associated with reliability enhancement are implemented or scheduled is flexible. In one embodiment, the reliability enhancement operations can be in order, out of order, interleaved and so on. In one exemplary implementation, an in-order operation executes the instructions in substantially the same order as retrieved without reordering in a sequencer and an out-of order operation executes instructions that are re-sequenced relative to corresponding non-native instructions. Reliability enhancement operations can be performed in an order that is not the same as an application program order. The reliability enhancement can operate on a machine that can be either an out of order machine or an in order machine. With regards to a microprocessor architecture, there can be an out of order processor with a reorder buffer and it retires the data out of the reorder buffer after checking the reorder buffer content for a match/mismatch. In one embodiment, whether or not things are reordered the fault checking can still be executing speculatively because there is something to rollback to. There can be two separate parallel instruction paths and then at some point the results are compared to decide if there is a match and commit or mismatch and rollback. In one exemplary implementation, the algorithm or microcode can schedule the order in which reliability enhancement operations are performed Example Reliability Enhancement System FIG. 9 is a block diagram of exemplary micro-processing system 900 in accordance with one embodiment. Micro-processing system 900 includes a microprocessor core 910 and associated software and memory hierarchy 920 that may be employed in connection with the systems and methods described herein. In particular, the depicted system may be implemented to efficiently make use of the reliability enhancement approaches described above, and that will be further described below in connection with various examples.

ARM instructions 902 are received and forwarded to translation system 904. In one embodiment, the ARM instructions are similar to the target code 120 and micro-processing system 900 is similar to reliability enhancement processing component 150.

The microprocessor core further includes processing hardware which typically includes fetch logic 911, decode logic 912, scheduler 913, execution logic 914, memory logic 918, and writeback logic 919. Fetch logic 911 retrieves instructions from one or more locations of memory hierarchy 920 (but typically from either unified or dedicated L1 caches backed by L2 and L3 caches and main memory). In one embodiment, the fetch logic can include a translation-address cache (THASH). Decode logic 912 decodes received non-native machine instructions into native machine instructions. The decoding can include parsing opcodes, operands, and addressing modes. The native machine instructions are forwarded to scheduler 913. Scheduler 913 schedules native machine instructions received from decode logic 912 and fetch logic 911 for execution by execution logic 914. Execution logic 914 includes engines 915 and 916 which can perform functionally duplicative speculative executions, and the functionally duplicative speculative executions may be performed substantially in parallel. Execution logic 914 includes comparison component 917 that compares the results of the functionally duplicative speculative executions. In load/store architectures, memory logic 918 performs load and store operations, such as loading an operand from main memory into a processor register. For operations that produce a primary result (e.g., as opposed to those that perform a branch to another location in the executing program), writeback logic 919 writes the result to an appropriate location, such as a processor register.

It should be understood that the above pipestages are somewhat specific to, and included in, a typical RISC implementation. More generally, a microprocessor may include fetch pipestages, decode pipestage, and execution logic, with memory and writeback functionality being carried out by the execution logic. The presented reliability enhancement systems and methods are advantageously implemented by these and other microprocessor implementations.

In one embodiment, instructions may be fetched and executed one at a time, possibly requiring multiple clock cycles. During this time, significant parts of the data path may be unused. In addition to, or instead of, single instruction pre-fetch methods may be used to improve performance and avoid latency bottlenecks associated with read and store operations (e.g., the reading of instructions and loading such instructions into processor registers and/or execution queues). In addition, the exemplary microprocessor may be pipelined to exploit instruction level parallelism and better utilize the data path so that there are multiple instructions in different stages of execution at the same time. Still further, fetch logic 911, decode logic 913, execution logic 913, etc., may be individually pipelined with multiple logic stages to improve performance. It is appreciated a super-scale microprocessor capable of multiple execution limits doing work in parallel can also be used.

Microprocessor core 910 includes and/or may communicate with various memory and storage locations of memory hierarchy 920. Memory hierarchy 920 includes L1 processor cache 921, L2 processor cache 922, L3 processor cache 933, memory controller 924, main memory 927 (e.g., one or more DRAM chips, solid state memory, etc.), secondary storage 928 (e.g., magnetic storage units, optical storage units, etc.) and/or tertiary storage 929 (e.g., a remoter server, the Internet cloud, etc.). Some or all of these locations may be memory-mapped, though in some implementations the processor registers may be mapped differently than the other locations or may be implemented such that they are not memory-mapped. The L1, L2, and L3 caches may or may not be on the processor die/core, though in many cases at least the L1 cache will be on the processor core. It will be understood that the memory/storage components are listed above in increasing order of access time and capacity, though there are possible exceptions. Memory controller 924 may be used to handle the protocol and provide the signal interface required of main memory 927 and to schedule memory accesses. The memory controller can be implemented on the processor die or on a separate die. It is to be understood that the locations set forth above are non-limiting and that other memory/storage locations may be used without departing from the scope of this disclosure.

Microprocessor core 910 is configured to execute instructions that generally are described and defined by an industry standard architecture ISA that is native to the processor. In one embodiment, native machine instructions are generated by converting non-native instructions into native machine instructions. Source code is converted into target code and if the target code is a non-native instruction the target code is converted into a native machine instruction. The conversions provide substantially equivalent functionality. In one embodiment, conversion can include translating, decoding, interpreting, and so on of the non-native instructions. The conversion can involve a hardware decoder receiving non-native target ISA instructions and generating native instructions from those non-native target ISA instructions. The conversion can include translation of the non-native target ISA instructions into native machine instructions, typically via a translation system 904. In one embodiment, the translation system 904 is a dynamic binary translation system and the translations are executed without the need of the hardware decoder (e.g., the translations are routed to the execution units bypassing the decoder, etc). In one exemplary implementation, conversion is performed by a dynamic code optimization process in which the conversion into native machine instructions is performed by the decoder 912 and includes optimization features. The translation system can include a carved out private secure piece of instruction memory and can include a trace cache.

Microprocessor core 910 may be configured to execute various instruction set architectures which may be characterized as complex instruction set computing architecture (CISC architecture), reduced instruction set computing architecture (RISC architecture), and/or very long instruction word (VLIW) architectures. Furthermore, it is possible that a given instruction set may have characteristics associated with more than one of these regimes. In addition, some instruction sets that are thought of as CISC implementations may in fact be executed on microprocessor core 910 in a RISC-like fashion. For example, the widely employed x88 architecture, though considered a CISC system, is often implemented in a manner that is more associated with a pipelined RISC implementation. Again, regardless of the particular ISA or its characteristics, the present disclosure provides a way of efficiently utilizing translations of the ISA code portions.

Instantiation of code as a series of processor-recognized instructions (e.g., ISA instructions) may entail compiling code of an operating system, application, driver, etc. to produce binary code that is executed by microprocessor 910. During compilation or post-processing operations, VLIW-type techniques may be employed (e.g., in a software layer) to effect various optimizations. In some cases, these software optimizations are employed so that the microprocessor can execute instructions in program order without the need for the complex hazard detection and avoidance/mitigation hardware that are present in many CISC and RISC execution pipelines. That said, in some cases software and/or decode and execution hardware may be employed to perform dynamic optimization and hazard avoidance in lieu of, or in addition to, VLIW techniques.

Memory hierarchy 920 storage locations may include a secure/private memory allocation accessible by microprocessor core 910 during execution of native ISA instructions. This memory allocation may, for example, be used for execution of a software layer and storage of associated data. In one embodiment there is a library of translations that have been generated from corresponding blocks of target ISA code. These translations may vary in length and the extent to which they have been optimized.

The reliability mitigation can be applied to both detect transient and permanent faults or recoverable and non-recoverable problems. In one embodiment, transient problems and recoverable problems can be corrected or fixed. In one exemplary implementation, the transient problems and recoverable problems are corrected by error mitigation techniques (e.g., rollback to valid commit point, performing ECC, etc.). Permanent faults or non-recoverable problems are not readily corrected or fixed, per se. A defect such as a hardware manufacturer defect can be considered a permanent or non-recoverable problem. In one embodiment, analyses of the fault checking results can include determining if there is a malfunction or defect in the hardware. For example, if particular hardware components tend to produce results that indicate a large number of speculative execution comparison mismatches or other errors, this in turn can indicate that there is a malfunction in the hardware and the hardware has broken or gone bad, rather than an inadvertent error. In one exemplary implementation, a workaround is available, (e.g., utilizing a spare component, enabling an alternate component, etc.). A spare or alternate pipeline or memory block may be utilized for the processing or storage.

Example Reliability Enhancement Method

Figure 10:
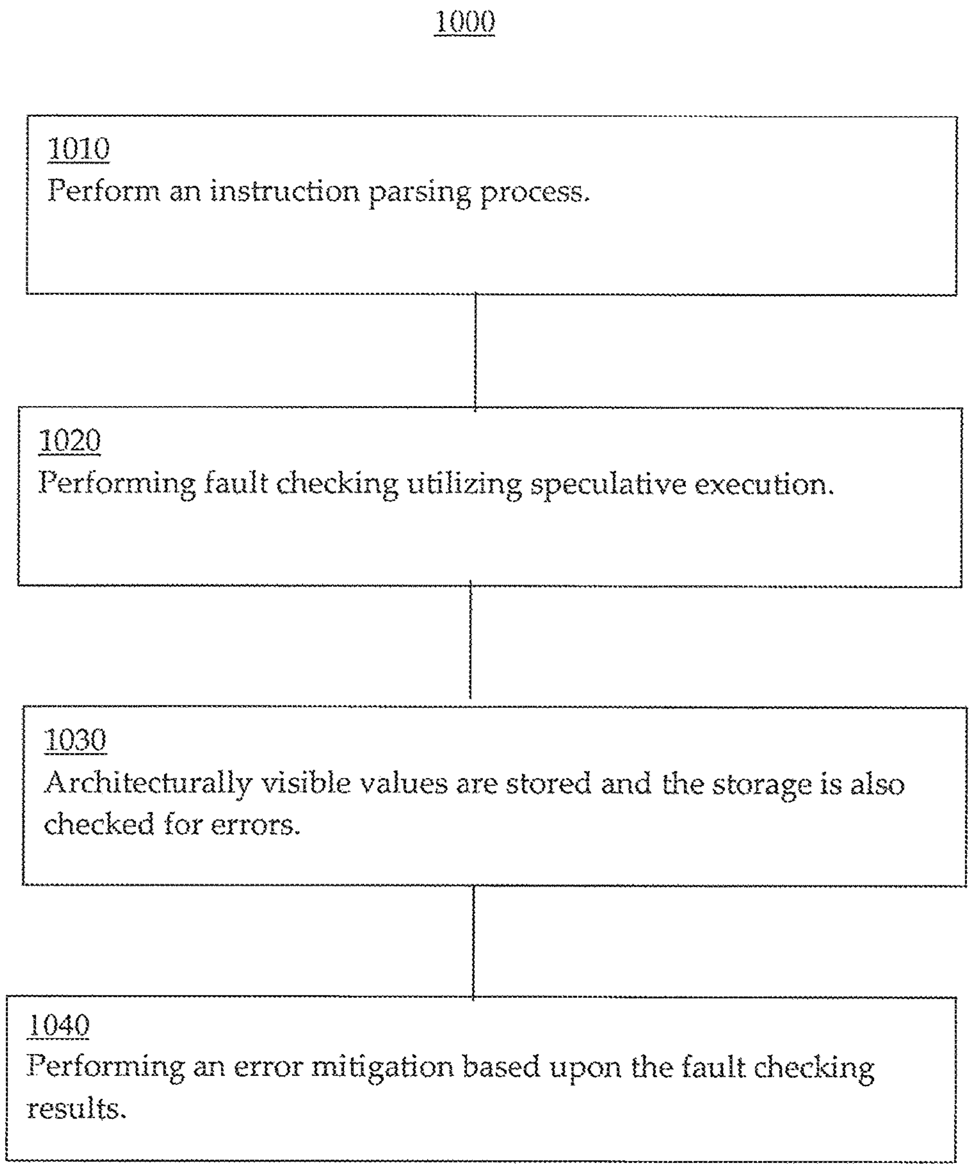
FIG. 10 is a flowchart of an exemplary computer implemented error mitigation method in accordance with one embodiment.

FIG. 10 is a flowchart of an exemplary reliability enhancement method 1000 in accordance with one embodiment.

In block 1010, an instruction parsing process is performed. In one embodiment, higher level language instructions are received or accessed. The higher level languages are parsed to determine a functionality associated with the higher level instructions.

In block 1020, operations associated with instructions are performed and incident to performing the operations a fault checking process is performed. The fault checking process can include speculatively executing multiple sets of operations corresponding to a particular functionality and comparing the results. The multiple sets of operations can be functional duplicates of the particular functionality. If the comparison matches the resulting value can be made architecturally visible. In one exemplary implementation, the result is committed. If the comparison results do not match, the process proceeds to block 1040.

In block 1030, values that are made architecturally visible are stored and the storage is also checked for errors. In one embodiment, an ECC process is performed.

In block 1040, error mitigation is performed. Various mitigation operations can be implemented and can depend upon the type of operations associated with the functionality (e.g., an execution operation, a storage operation, etc.). In one embodiment, the mitigation operations associated with speculative execution can include rolling back to a known valid or good state (e.g., last commit state, etc.) and trying again. In one exemplary implementation, the mitigation operations associated with a storage operation can include a parity correction process. The parity correction process can be implemented if the error correction code indicates a memory storage problem.

Various reliability enhancement mechanisms can be included in the fault checking and error mitigation to enable reliability enhancement of state elements, computation elements and data paths. The reliability enhancement can include features that protect against a bit getting flipped within a state element, a computation element, and a data path. In one embodiment, there are ALUs, load pipes, and store pipes which handle add, load, and store transactions. The arithmetic/logic functions, loads and stores can be done at least in part in parallel. The arithmetic/logic functions, loads, and stores can be interleaved or intermingled. It is appreciated the reliability enhancement can be applied to execution paths, load paths and storage paths facilitating reliability enhancement coverage of most or significant portions of a processor and data paths within a core of the processor. As a practical matter a sizable portion of the core can be covered by error mitigation or protection. In one embodiment, if a corresponding FIT rate analysis is done the coverage is actually very good. In one exemplary implementation, the error mitigation is 60% to 70%. With regard to errors occurring during signal propagation going from one component to another in a data path, an error in one of the data paths and not the other data path results in a difference between the two signals on the data paths. The difference can be caught or detected by the comparison of the signals.

Reliability Enhancement of State Elements and Storage

The reliability enhancement can also deal with other problems in addition to mismatching comparison results (e.g., a branch misdirect, a page fault, other different ways the speculation can go wrong, etc.). With regards to state elements or storage components, ECC mechanisms can also be utilized for error mitigation. While ECC may not be readily adaptable for error mitigation of computation components, almost any fixed data structure can be protected with ECC. An ECC operation can be used for information stored in the buffers. ECC can be used to help identify and correct errors in the check point or rollback values. Having valid information in a storage element that maintains a check point or rollback value can be important because the rollback value is assumed to be the last known valid or good value used to enable recovery and continued operation (e.g., recover from something going wrong with the speculative execution in the computation elements, etc.). In one exemplary implementation, the reorder buffer is also ECC protected and if there is an errant bit flip in information from the reorder buffer it can be detected and possibly corrected.

In one embodiment, the load and store data paths include error mitigation protection. Reliability enhancement in the load and store data paths can be somewhat complicated. In one embodiment, comparing the results of a store operation can be complex because the data is not actually in the registers anymore. In one exemplary implementation, what the reliability enhancement is really trying to verify is the store went out to the memory correctly. Similarly, there are situations where reliability enhancement for data path load operations has to be careful about what is actually done in the comparison. In one exemplary implementation, if a load is issued twice and there are two hits in the cache, care is taken to ensure what is actually done twice versus not done twice. There can be an overlap between the issuing of load operations and the hits, in that they join at the cache. In one example, anytime it is going to the point of actually observing these problems it is usually going into a large storage structure and can be ECC protected.

In one embodiment, reliability enhancement is directed to a code portion that involves loads and stores associated with a large ECC protected structure. Information can be loaded in a register and then stored in the ECC protected structure. The stored information can later be retrieved from the ECC protected structure and loaded in a register. It can be difficult to actually compare the final results of the store. In one exemplary implementation, the incoming stored information is loaded in a register and the reliability enhancement makes sure the register value is the same as the values for both computations. In one embodiment, the only thing that may not have error mitigation is the data path between the store and the final cache itself. It is appreciated the reliability enhancement of reloading a value back from a storage location and comparing to the value sent to the storage can also be applied to a non ECC protected storage.

In another embodiment, there are ways to help provide reliability enhancement coverage for the data path between the store and the final cache itself. The first is an end-to-end protection mechanism in the data path between where the store happens and it actually gets written into cache. The second is a checking mechanism. The checking mechanism can include storing twice and a performing comparison. The third is to store the information or values, read the values back and compare the values. In one exemplary implementation, there are two separate stores to the same address with what is supposed to be the same data and then a comparison is performed right before the data is written to the cache. This can help provide reliability enhancement coverage for the data path between the store and the final cache itself.

The following is one pseudo code example of a load:

```
ld:    ld a=[ ]
ld b=[ ]
comp alt ab
```

It is loaded twice and the results compared. In one embodiment, the basic load operation "ld" is considered a single load transaction associated with a particular address even though there is a load to register "a" and a load to register "b". To check the reliability of the transaction results, the values in register "a" and register "b" are compared. This leverages more of the machine mechanisms to be able to reorder loads and stores since it actually has to assure that when it loads from the same address twice it gets the same answer regardless of when it is done in time. If the comparison indicates the values in the registers match the transaction is considered successful or valid. If the values do not match it will fail for different reasons indicating the line was taken away. This can happen during the speculative execution and indicate when data is lost in certain execution modes. If there is a mismatch an error mitigation process can be performed. In one exemplary implementation, while the values in the registers are being checked there is a guard against other transactions attempting to change the register values. There is a joint point at the caches and the caches are ECC protected. It is still actually protecting the data path from the cache into the register file, which is also protected. It covers when going from things that are not ECC protected across data path or across computations.

The following is one pseudo code example of a store:

```
st:    st [m]=a
ld b=[m]
comp alt ab
```

For stores the data is moved back, because of control and the ability to flexibly output anything. So for a store the value is moved to the storage device and no longer in the register to compare, but it can be loaded back and compare to check if the data that is loaded back is the value that was forwarded for storage. Which is not exactly the same as executing the storage twice but it is protection in a similar way. In one embodiment, it makes a round-trip down to the storage unit offering similar protection as if it was executed. In one exemplary implementation, store reliability enhancement is done in certain speculation execution modes.

Figure 11:
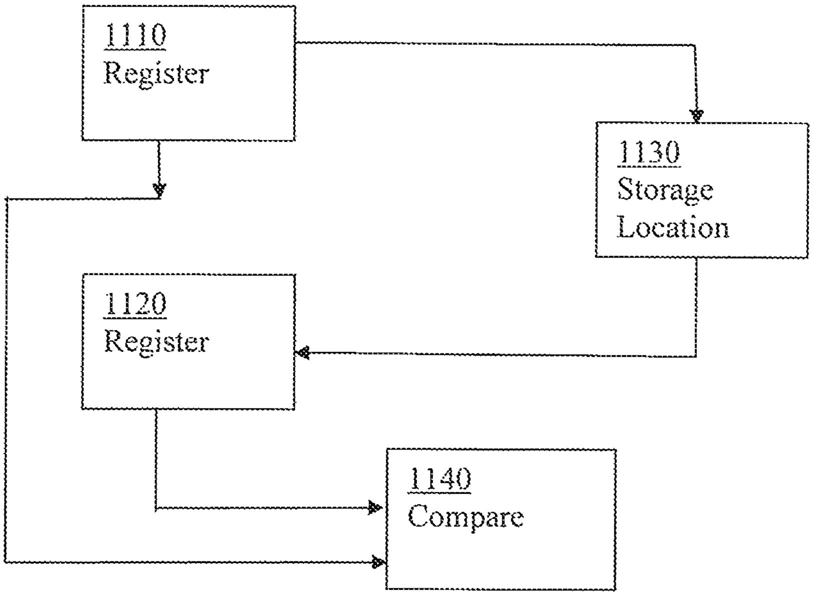
FIG. 11 is a block diagram of exemplary storage reliability enhancement in accordance with one embodiment.

In one embodiment, values that are made architecturally visible are stored and the fault checking includes checking storage. FIG. 11 is a block diagram of exemplary storage reliability enhancement in accordance with one embodiment. The storage checking can include storing an initial storage value from a first register 1110 to a first storage location 1130. A return storage value is loaded back from the first storage location 1130 to a second register 1120. The initial storage value in the first register 1110 and the return storage value in the second register 1120 are forwarded to comparator 1140 for comparison. If the comparison indicates the results match, then the value stored in storage location 1130 is accepted as accurate. If the comparison indicates the results do not match, error mitigation can be performed. The error mitigation can include a variety of approaches (e.g., ECC, parity correction, repeating the store process again, and so on).

In one embodiment, there are a number of things that are taken into consideration when performing reliability enhancement for branch operations. The reliability enhancement is not exactly the same traditional software executing twice which may result in error mitigation holes. One exemplary error mitigation implementation is to do a FIT rate analysis to determine where those holes are actually a problem. In addition, there can be chokepoints on anything consuming resources.

Reliability Enhancement of Branch Operations

The following is one pseudo code example of a branch:

```
Br:    comp alt inputs
br[ ]
```

The inputs are compared for branches. If it is an indirect target, the indirect targets are compared to make sure they are the same. If flags are being used for the branch, the process makes sure they are the same. Then it proceeds with the branch if they match, but there really is only one branch so the branch itself may not be covered, but at least it makes sure that the same things leading up to the branch are covered. In one exemplary implementation, there are branches which do the compare on the condition feeding into the branch and just do the branch once. It can check the flag essentially right before the branch and make sure that is covered and consistent between the two separate paths of calculation (because there are two different sets of flags at that point).

Example Reliability Enhancement Pipeline

It is also appreciated that the operations can be flexibly assigned to different hardware. In one embodiment, there are multiple arithmetic logic units (ALUs). Operations associated with different sets of instructions corresponding to the duplicated functionality are assigned for implementation on selected different ALUs. In one exemplary implementation, the microcode has control and specifies on what hardware (e.g., ALUs, load pipes, etc.) a particular set of operations get executed. The speculative execution operations can be scheduled for implementation on whatever particular hardware as selected by an algorithm, which in turn can increase the robustness of the algorithm.

Figure 12:
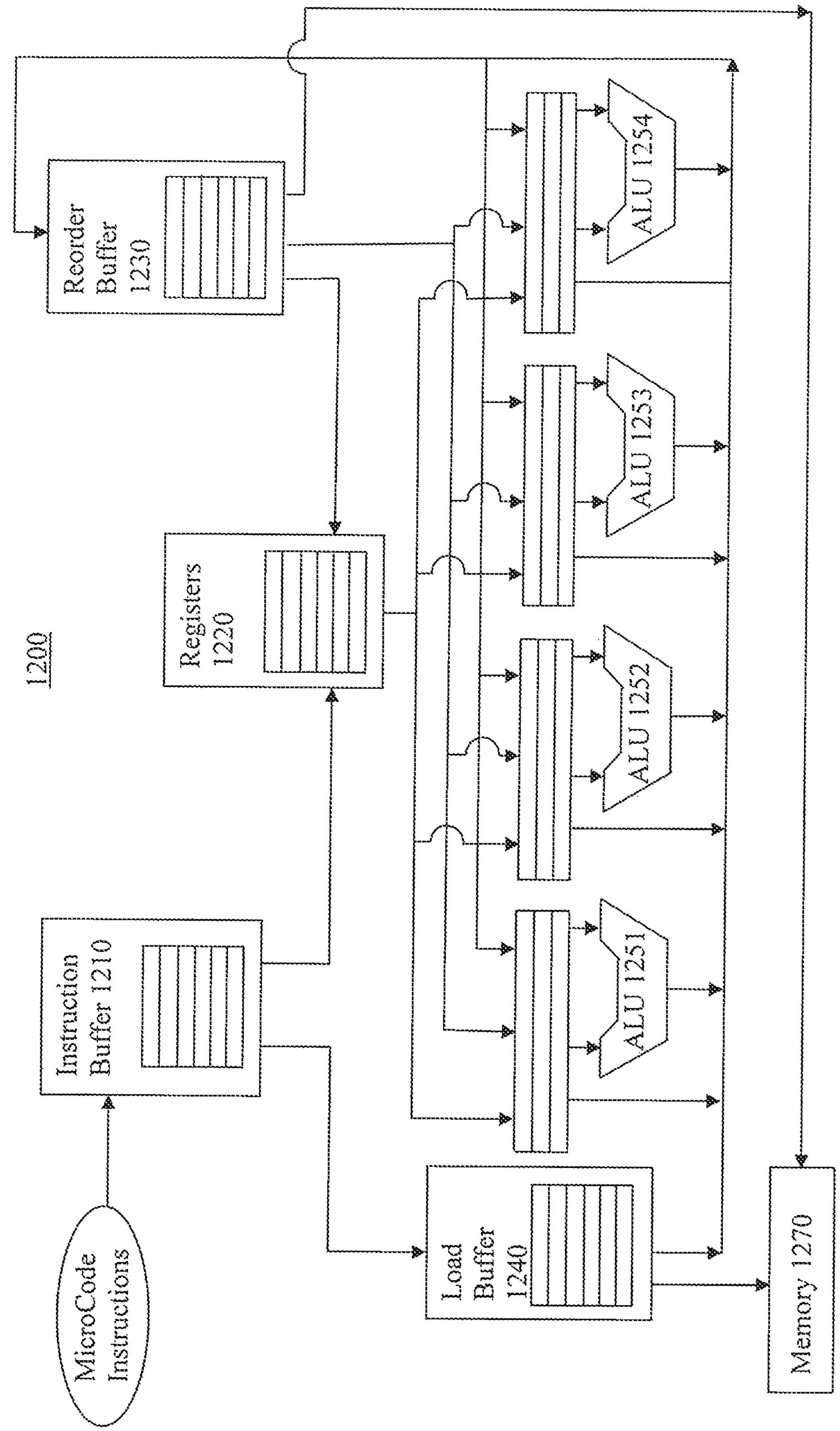
FIG. 12 is a block diagram of an execution pipeline in accordance with one embodiment.

FIG. 12 is a block diagram of an execution pipeline 1200 in accordance with one embodiment. The execution pipeline 1200 can be similar to or include execution components (e.g., 430, 530, etc.) and comparison components (e.g., 440, 540, etc.). Execution pipeline 1200 includes instruction buffer 1210, registers 1220, reorder buffer 1230, load buffer 1240, memory 1270, and arithmetic logic units (ALUs) 1251, 1252, 1253, and 1254. It is appreciated that the error mitigation speculative execution operations can be interleaved between the components of execution pipeline 1200.

Figure 13:
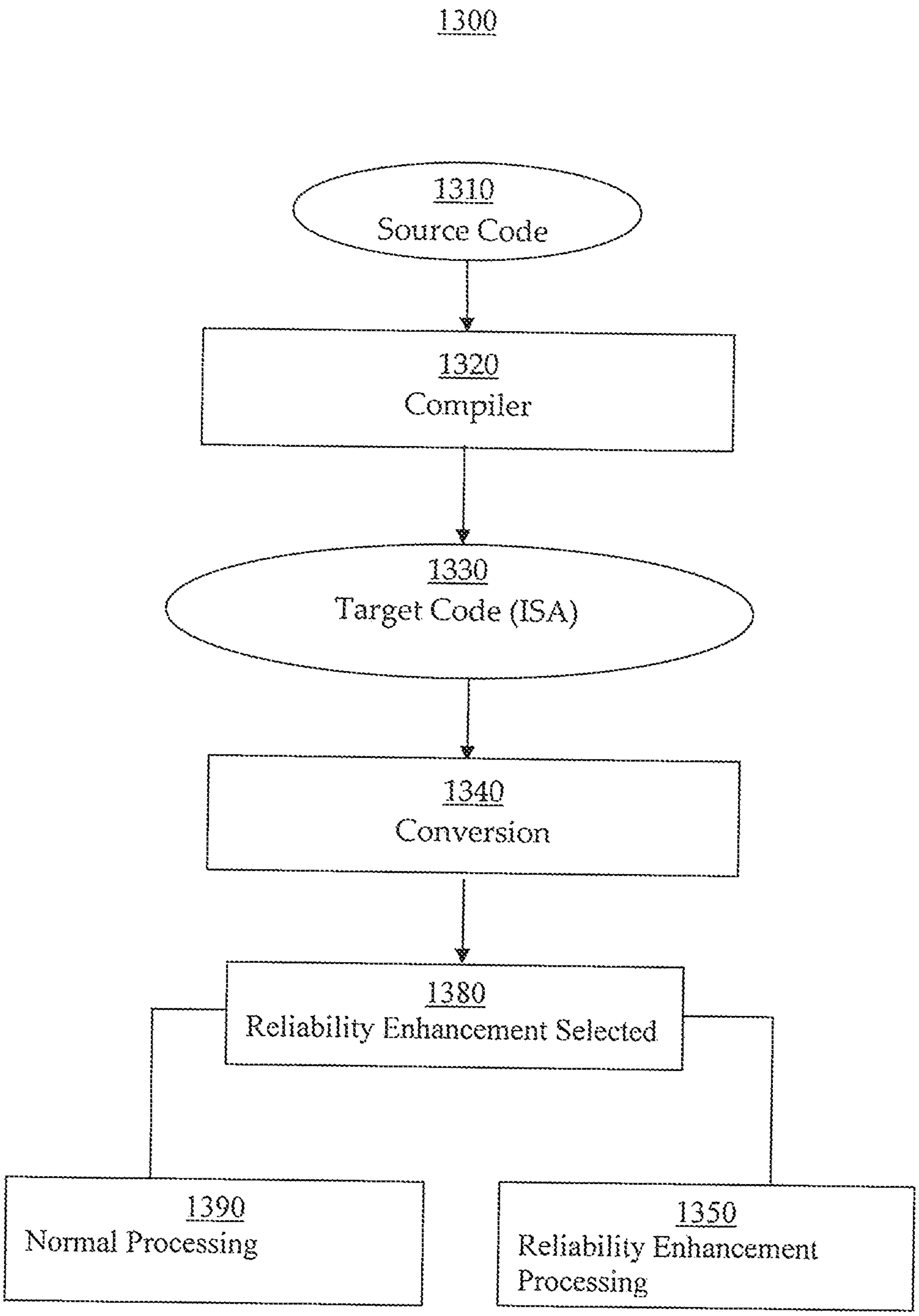
FIG. 13 is a block diagram of exemplary processing flow 1300 in accordance with one embodiment.

FIG. 13 is a block diagram of exemplary processing flow 1300 in accordance with one embodiment. Source code 1310 is compiled in block 1320 into target code 1330, which is converted into native machine instructions by conversion component 1340. A reliability enhancement trigger is checked in block 1380. If reliability enhancement is triggered the reliability enhancement processing 1350 is performed. If the reliability enhancement is not triggered then normal processing 1390 is performed. It is appreciated that the normal processing 1390 can also include many functions including instruction conversion (e.g., translation, interpretation, decoding, etc.) optimization, speculative execution (e.g., branch prediction speculative execution, other speculative execution not related to reliability enhancement fault checking, etc.), and so on.

Example Operation Sequence

Figure 14:
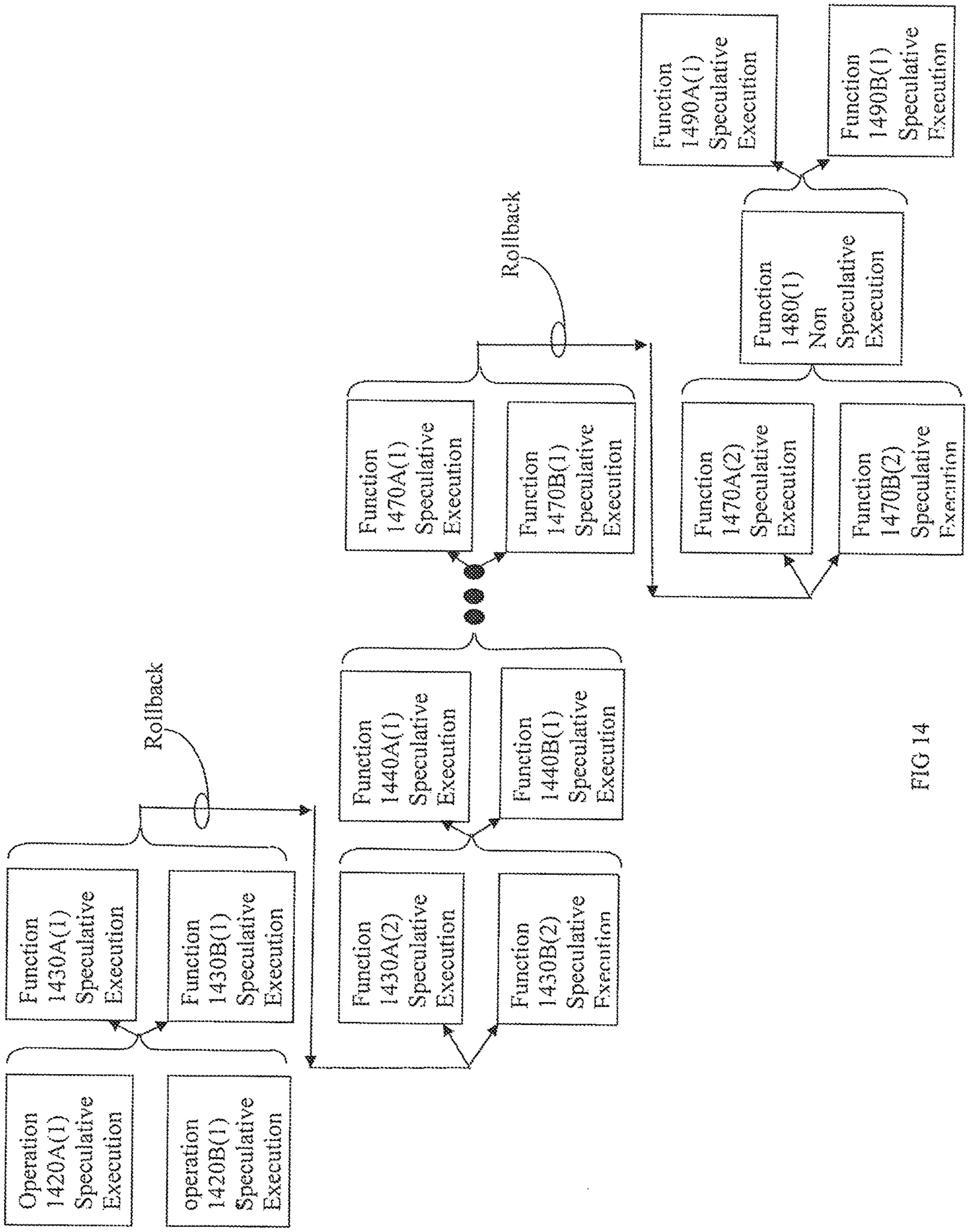
FIG. 14 is a block diagram of an exemplary sequence of operations in accordance with one embodiment.

FIG. 14 is a block diagram of an exemplary sequence of operations in accordance with one embodiment. The base reference number (e.g., 1420A(1), 1430A(1), etc.) indicates the function the operation is associated with, the suffixes A and B indicate the operations are functional duplicates, and the values within parenthesis indicate the number of times the operation is being executed. Function 1420 is functionally duplicated by operations 1420A and 1420B, which are speculatively executed. The (1) indicates it is the first time the operations are performed (e.g., 1420A(1) and 1420B(1)). The results of the speculative executions match and the sequence proceeds to the next function 1430. Function 1430 is functionally duplicated by operations 1430A and 1430B, which are speculatively executed. The results of the speculative executions do not match and the sequence rolls back to perform the operations again. Function 1430 is functionally duplicated by operations 1430A and 1430B, which are speculatively executed again and the (2) indicates it is the second time the operations are performed (e.g., 1430A(2) and 1430B(2)). The results of second speculative executions match and the sequence proceeds to function 1440. Function 1440 is functionally duplicated by operations 1440A and 1440B, which are speculatively executed. The results of the speculative executions match and the sequence proceeds through multiple other functions (not shown) until the sequence gets to function 1470.

Function 1470 is functionally duplicated by operations 1470A and 1470B, which are speculatively executed. The results of the first speculative execution of operations 1470A and 1470B do not match and the sequence rolls back to perform the operations again. Operations 1470A and 1470B are speculatively executed again. The results of the second speculative executions match and the sequence proceeds to function 1480. It is appreciated that some functions may not be speculatively executed. Function 1480 is not functionally duplicated and operation 1480 is executed non-speculatively once. The sequence proceeds to function 1490 which is functionally duplicated by operations 1490A and 1490B, which are speculatively executed once since the results match. The sequence can end or can continue (not shown).

It is appreciated that there is significant flexibility in the order in which the fault checking operations are performed during the speculative execution. The speculative fault checking operations may be interleaved, which is a significant improvement over traditional duplication in software. In one embodiment, several small steps of the computation are performed and the intermediate results compared. In one exemplary implementation, when the actual comparison happens during speculative execution is discretionary or up to the user. The reliability checking is not necessarily limited to architectural boundaries where results are committed or made architecturally visible. There can be multiple reliability fault checking operations performed between architectural boundary decision points. The algorithm or microcode can schedule whether a reliability enhancement speculative execution comparison is performed right before an architectural boundary decision point or earlier. In one exemplary implementation, a small number of speculative execution operations are performed and intermediate results are compared. If the comparison indicates the intermediate results are valid the process proceeds, the comparison value is not necessarily committed or made architecturally visible unless it is at an architectural boundary. In one embodiment, a transaction can fault or fail early or late.

In one embodiment, reliability enhancement activities are scheduled to accommodate critical path concerns. In one exemplary implementation, the reliability enhancement operations are compliant with critical path timing requirements. In one embodiment, the execution of the multiple duplicate functionality speculative execution streams can be independently processed between critical path commit points. In one exemplary implementation, the timing of the fault or fail in response to an unreliable condition is flexible as long as it is before a respective commit point.

In one embodiment, optimization can result in different processing to achieve the same functionality. The processing or execution can be directed to the respective speculative execution stream characteristics of features. In one embodiment the speculative execution streams are performed on different pipelines.

The pipelines can have different characteristics and features. In one embodiment, optimization is directed to the respective characteristics of features. In one exemplary implementation, one speculative execution stream is processed on first pipeline with a first set of characteristics and features, and the other speculative execution stream is processed on second pipeline with a second set of characteristics and features. The different pipelines may perform different instructions or operations to achieve the same functionality.

Figure 15:
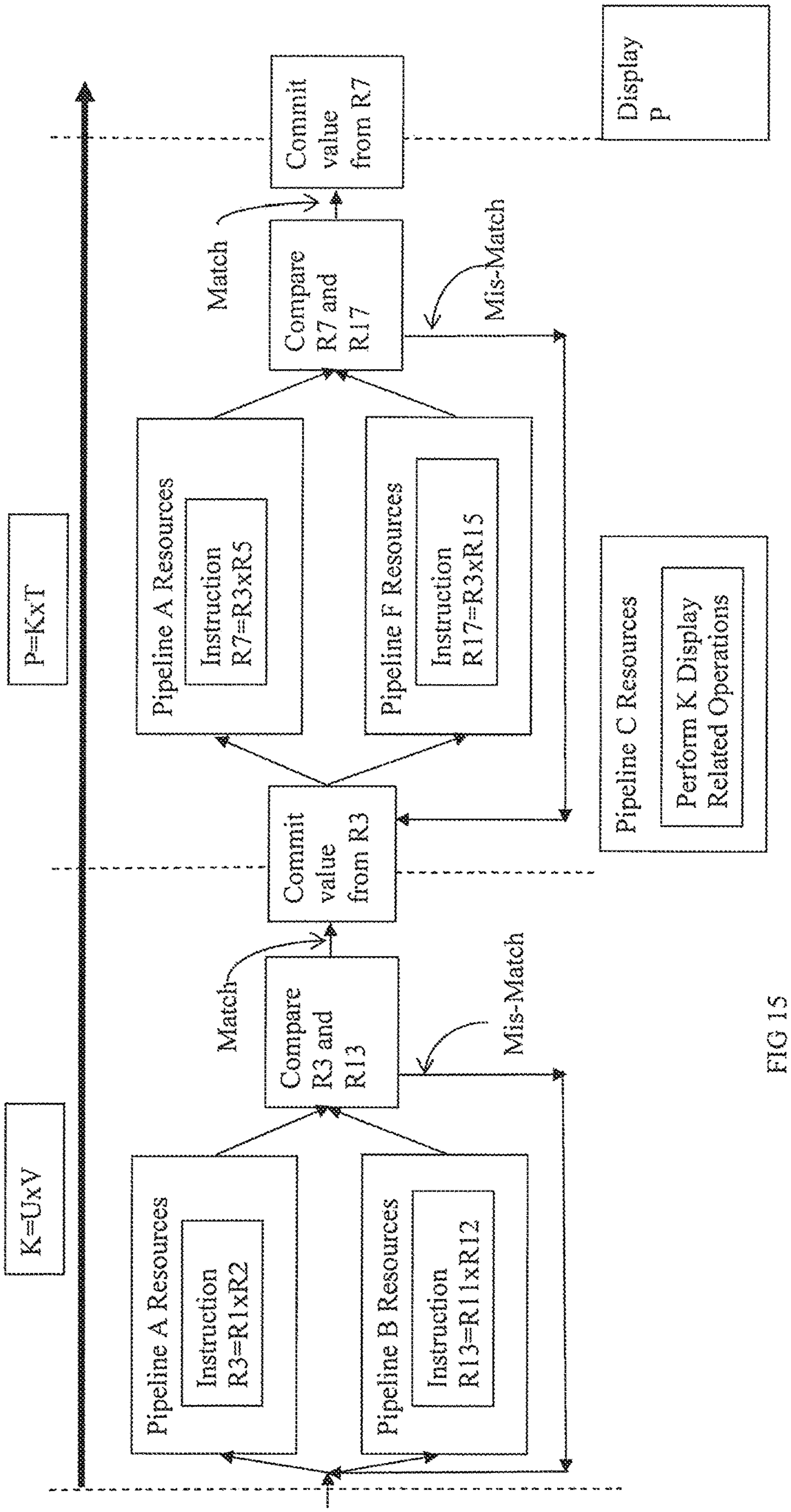
FIG. 15 is a process flow of exemplary fault checking in accordance with one embodiment.

FIG. 15 is an exemplary process flow 1500 of fault checking in accordance with one embodiment. Process flow 1500 is directed to performing a functions K equals U times V ($K=U\times V$) and P equals K times T ($P=K\times T$). The higher level language instruction $K=U\times V$ is converted into machine instructions (e.g., load U in R1 and load V in R2, multiply value in R1 by value in R2 and load result in R3). These native machine instructions are executed using pipeline A resources. The functionality of the higher level language instruction $K=U\times V$ is duplicated by another set of native machine instructions (e.g., load U in R11 and load V in R12, multiply value in R11 by value in R12 and load result in R13). These native machine instructions are executed using pipeline B resources. The resulting value in R3 is compared to the resulting value in R13. If the values match the value in R3 is committed architecturally. If the values do not match the process rolls back begins again.

The higher level language instruction $P=K\times T$ is converted into native machine instructions (e.g., load T in R5, multiply value in R3 by value in R5 and load result in R7). These native machine instructions are executed using pipeline A resources. The functionality of the higher level language instruction $P=K\times T$ is duplicated by another set of native machine instructions (e.g., load T in R15, multiply value in R3 by value in R15 and load result in R17). These native machine instructions are executed using pipeline B resources. The resulting value in R7 is compared to the resulting value in R17. If the values match the value in R7 is committed architecturally. If the values do not match the process rolls back to a safe or reliable point (e.g., the commit in R3) and begins the process again.

Figure 16:
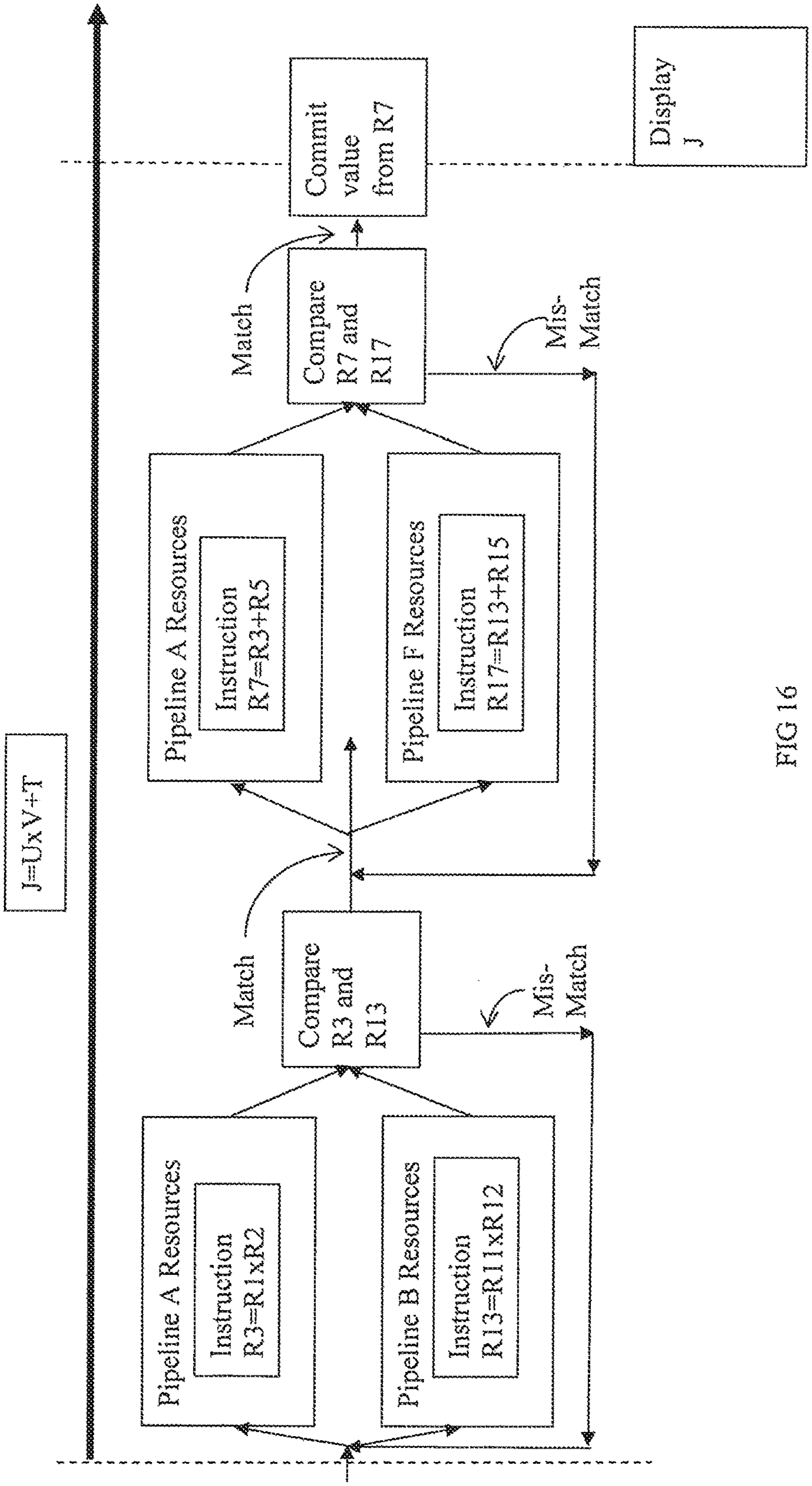
FIG. 16 is a process flow of exemplary multiple fault checks between commit points in accordance with one embodiment.

It is appreciated that faults can be checked between commit points. FIG. 16 is an exemplary process flow 1600 with multiple fault checks between commit points in accordance with one embodiment. Process flow 1600 is directed to performing a functions P equals U times V plus T ($P=U\times V+T$). The higher level language instruction $U\times V$ is converted into native machine instructions (e.g., load U in R1 and load V in R2, multiply value in R1 by value in R2 and load result in R3). These machine instructions are executed using pipeline A resources. The functionality of the higher level language instruction K=U×V is duplicated by another set of native machine instructions (e.g., load U in R11 and load V in R12, multiply value in R11 by value in R12 and load result in R13). These native machine instructions are executed using pipeline B resources. The resulting value in R3 is compared to the resulting value in R13. If the values match the value in R3 the process proceeds (but does not necessarily commit R3). If the values do not match the process rolls back begins again. The addition of T is converted into native machine instructions (e.g., load T in R5, add value in R3 to value in R5 and load result in R7). These native machine instructions are executed using pipeline A resources. The functionality of the higher level language instruction adding T is duplicated by another set of native machine instructions (e.g., load T in R15, add value in R13 to value in R15 and load result in R17). These native machine instructions are executed using pipeline B resources. The resulting value in R7 is compared to the resulting value in R17. If the values match the value in R7 is committed architecturally. If the values do not match the process rolls back to a safe or reliable point (e.g., the value in R3 and R13) and begins the process again.

Figure 17:
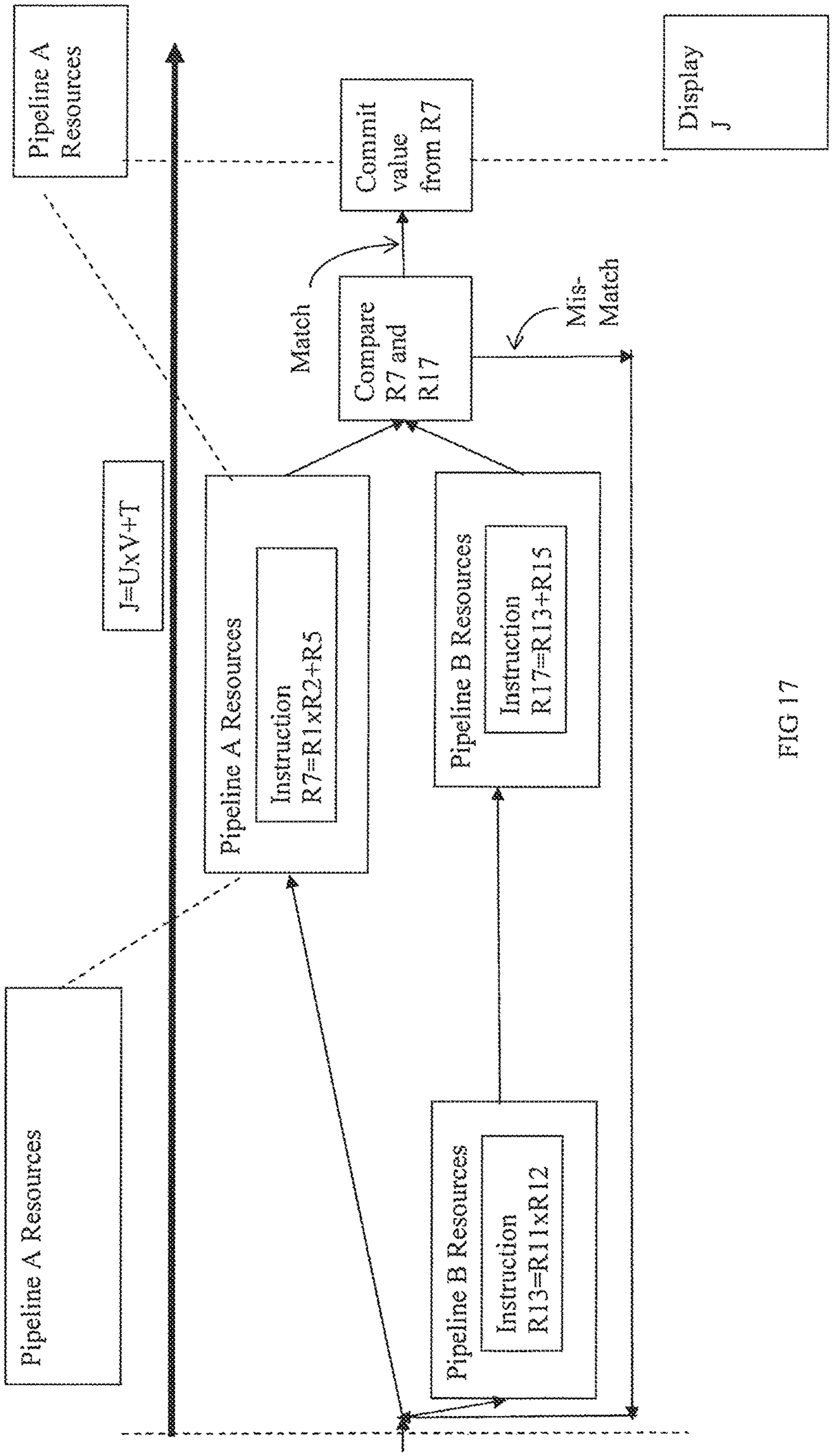
FIG. 17 is a process flow of exemplary different pipelines in accordance with one embodiment.

It is also appreciated that different pipelines may have different characteristics or capabilities. FIG. 17 is an exemplary process flow 1700 in which different pipelines may have different characteristics or capabilities in accordance with one embodiment. Pipeline B can perform addition and multiplication based on a single native machine instruction. Pipeline A performs multiplication and addition based on two native machine instructions. Process flow 1700 is directed to performing a function P equals U times V plus T (P=U×V+T). For pipeline A, the higher level instruction P=U×V+T is converted into load U in R1, load V in R2, Load T in R5, then multiply the values in R1 and R2 and add the value in R5. For pipeline B, the higher level language instruction U×V is converted into another set of native machine instructions load U in R11 and load V in R12, multiply value in R11 by value in R12 and load result in R13. The functionality of the higher level language instruction adding T is converted into native machine instructions (e.g., load T in R15, add value in R13 to value in R15 and load result in R17). The resulting value in R7 is compared to the resulting value in R17. If the values match the value in R7 is committed architecturally. If the values do not match the process rolls back to a safe or reliable point and begins the process again.

In one exemplary implementation, the speculative execution checking has little or no impact on critical path timing. In one exemplary implementation, the speculative execution checking does not make the critical path timing appreciably longer between commit points than would other wise occur. Furthermore, the speculative execution checking does not introduce additional or new stalls to memory.

In one embodiment, the critical path is associated with presenting values on a display or monitor. With reference back to FIG. 15 the value in R3 is committed prior to a critical path display need by pipeline C resources and the value in R7 is committed before the critical path display need. With reference back to FIGS. 16 and 17 the value in R7 is committed prior to a critical path display need. In one embodiment, if error mitigating processes can not be completed before critical path requirements then alternative measures can be taken. In one self-driving vehicle exemplary implementation, if the error mitigating processes can not be completed within critical path safety requirements (e.g., a safety requirement that processing be completed with narrow timing limits, limited number of retries, etc.), alternative measures can be taken (e.g., notification of problem, safe shutdown, etc.).

Figure 19:
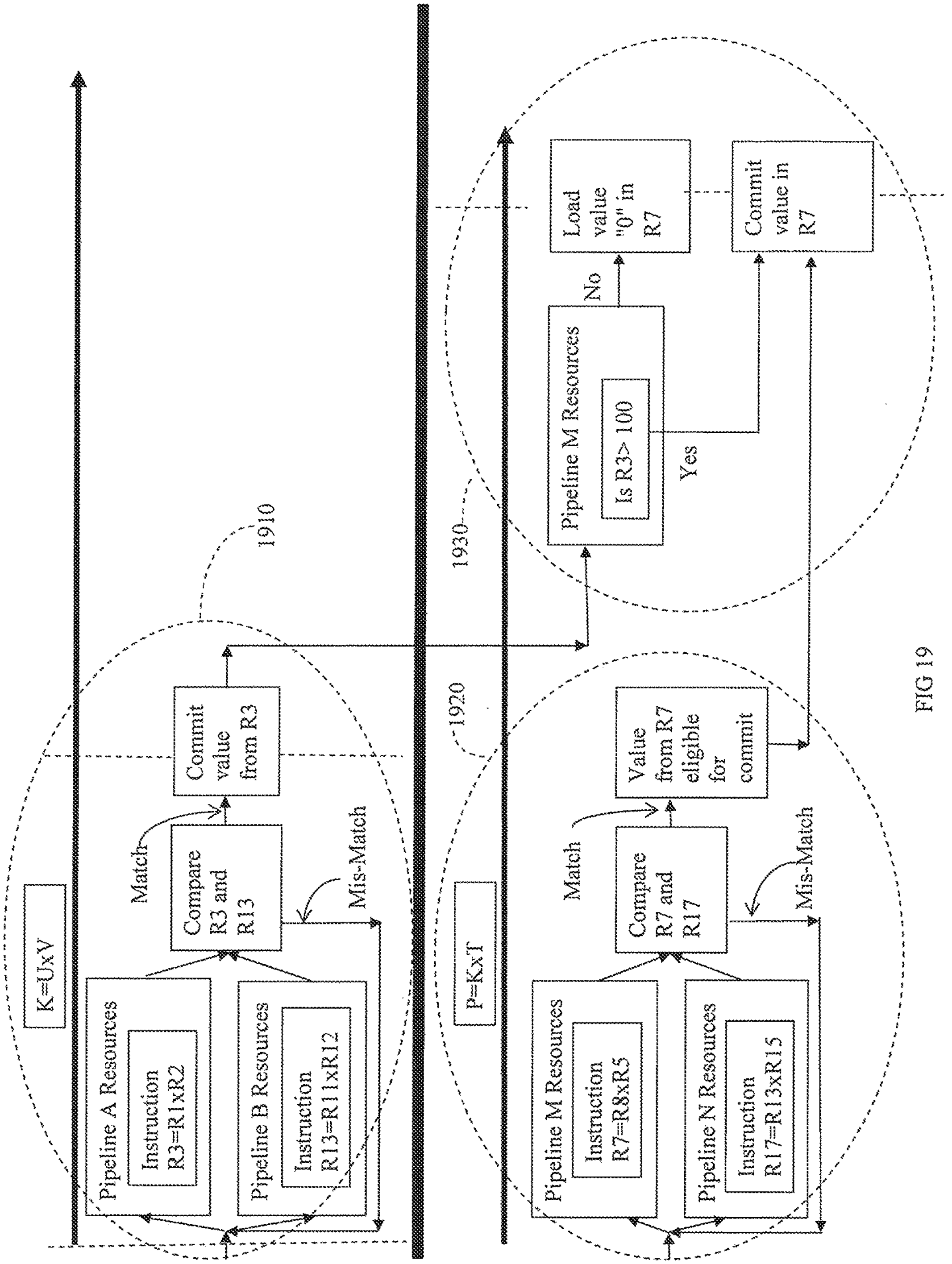
FIG. 19 is an exemplary process flow of fault checking in accordance with one embodiment.

In one embodiment, the comparison output (e.g., input values match, input values do not match, etc.) is just one of a plurality of factors or considerations in making a value architecturally visible. In one exemplary implementation, passing the fault checking speculative execution compare (e.g., speculative execution result values are the same, match, indicate reliable execution, etc.) makes the results eligible to for commitment but does not necessarily lead to the results being made architecturally visible. FIG. 19 is an exemplary process flow 1900 of fault checking in accordance with one embodiment. Process flow 1900 is similar to process flow 1500 except there is a conditional dependency. The following is exemplary pseudo code for process flow 1900:

```
K=U×V
If (K>100) then
        (P= K×T)
   else
        (P=0)
End If.
```

The higher level language instruction K=U×V is performed in fault checking speculative execution operations 1910. As there is no conditional dependency for the K=U×V function the results are committed in operation 1911 if the comparison results match. The higher level language instruction P=K×T is performed in "nested" speculative executions in the sense that fault checking speculative executions operations 1920 are performed subject to the outcome of the conditional dependency operations 1930. The P=K×T function has a conditional dependency that K be greater than 100, but as part of an optimization the P=K×T function is speculatively performed approximately in parallel to the K=U×V operation before value of K is determined. The fault checking speculative execution operations 1920 determine if the value of P in R7 is "fault" free and eligible for architectural commitment if the conditional dependency is satisfied. The fault checking compare indicates the T value is good but it is not committed until the conditional dependency is met.

It is appreciated that faults can be checked between commit points. FIG. 16 is an exemplary process flow 1600 with multiple fault checks between commit points in accordance with one embodiment. Process flow 1600 is directed to performing a functions P equals U times V plus T (P=U×V+T). The higher level language instruction U×V is converted into native machine instructions (e.g., load U in R1 and load V in R2, multiply value in R1 by value in R2 and load result in R3). These machine instructions are executed using pipeline A resources. The functionality of the higher level language instruction K=U×V is duplicated by another set of native machine instructions (e.g., load U in R11 and load V in R12, multiply value in R11 by value in R12 and load result in R13). These native machine instructions are executed using pipeline B resources. The resulting value in R3 is compared to the resulting value in R13. If the values match the value in R3 the process proceeds (but does not necessarily commit R3). If the values do not match the process rolls back begins again. The addition of T is converted into native machine instructions (e.g., load T in R5, add value in R3 to value in R5 and load result in R7). These native machine instructions are executed using pipeline A resources. The functionality of the higher level language instruction adding T is duplicated by another set of native machine instructions (e.g., load T in R15, add value in R13 to value in R15 and load result in R17). These native machine instructions are executed using pipeline B resources. The resulting value in R7 is compared to the resulting value in R17. If the values match the value in R7 is committed architecturally. If the values do not match the process rolls back to a safe or reliable point (e.g., the commit in R3) and begins the process again.

Other items that may be considered or factor into a decision regarding making a value architecturally visible can include: is the speculative execution result still needed after control dependencies are resolved, is the result associated with a conditional branch or branch prediction, does an architectural event occur (e.g. a page violation, a memory alignment violation, a memory ordering violation, a break point, execution of an illegal instruction, etc.), are there issues with optimistic concurrency control, is an exception triggered, and so on. The fault event may occur during the conversion or be an artifact due to the particular way in which the conversion was performed.

Optimization

The systems and methods for improving reliability can be dynamic or change various aspects or features in response to changing conditions. The generation or formation of the instructions for the multiple sets of operations that duplicate a functionality can dynamically introduce accommodations directed at various considerations. In one embodiment, the accommodations or changes can be directed towards a particular difference in performance (e.g., faster, less power, improved compatibility with external components, etc.). Systems and methods for improving reliability can include various optimizations directed at improving performance and efficiency of reliability enhancement operations (e.g., including fault checking operations, error mitigation operations, etc.).

The conversion (e.g., decoding, translations, interpretation, etc.) into reliability fault checking duplicate functionality native machine instructions can be utilized or included with various types of optimizations. In one embodiment, the conversion includes dynamic binary translation. The conversion can utilize dynamic code optimization (DCO). In one exemplary implementation, the dynamic code optimization is implemented on a system with a hardware decoder included in a base level machine in which at least some of native machine instructions or microcode are operable without binary translation. In one embodiment, the optimization process includes re-optimizing to faster and faster optimizations. There can also be short cuts which are checked for correctness and are beyond conventional binary translation.

Optimizations can include use of alternate versions of source code that achieve the same observable functionality within an acceptable tolerance. The process can be redirected to either different native translations or corresponding target ISA code. Optimization can utilize a code portion profile to assist dynamic formation of native translations. The profile can include an indication of whether a set of instructions is a good or poor candidate for a particular type of conversion (e.g., translation versus decoding versus interpretation, etc.).

The optimizations can include a variety of different mechanisms. Decisions regarding the type of conversion (e.g., translations, decoding, interpretation, etc.) can be based on the frequency of the use of sets of instructions. In one embodiment, a tracking mechanism or branch count table that tracks the number of times an instruction is converted into native machine instructions is used. In one exemplary implementation, sets of instructions that are “hot” or used frequently can be can be dynamically translated and optimized. If the tracking mechanism indicates a set of instructions is executed infrequently or there is an indication that there is a relatively high overhead associated with translation operations hardware decoding may be preferred. Optimizations can be directed to circumventing a hardware decoder. In one exemplary implementation, a hardware redirector that reduces or bypasses use of a hardware decoder can be used.

The optimization can include translation fault mitigation directed at issues that can arise during translation (e.g., associated with architectural faults, faults due to over-optimization, etc.). In one embodiment, there is a library of translations than have been generated from corresponding blocks of ISA code. These translations may vary in length and the extent to which they have been optimized. It is appreciated that the term “block” as used herein can refer to a set or sequence of instructions of various lengths and is not necessarily limited to what might be referred to as a “basic-block”.

While most of the reliability enhancement speculative execution is described in terms of executing native instructions, it is appreciated that other types of instructions can be utilized by the execution components. In one embodiment, selected non-native instructions can be utilized or directly executed by the speculative execution components. This may provide optimization efficiencies over types of conversion implementations. In one exemplary implementation, a system that enables execution of non-native instructions can be used to execute code compiled for pre-existing processing systems. The non-native instructions that are directly executed can be duplicated and speculatively executed at the execution level for reliability enhancement fault checking.

It is appreciated that optimizations can be implemented at various instruction levels or iteratively between instruction levels. In one exemplary implementation, optimizations are dynamically implemented during or as part of conversions (e.g., translating, decoding, interpreting, etc.) directed at creating the multiple sets of operations associated with duplicating a functionality. In one embodiment, the optimizations can result in comparatively better (e.g., faster, less power, etc.) performance than a simple straightforward translation of architectural level instruction. Optimizations can also be performed at the target code or ISA level and source code level before conversion to native machine instructions.

Figure 18:
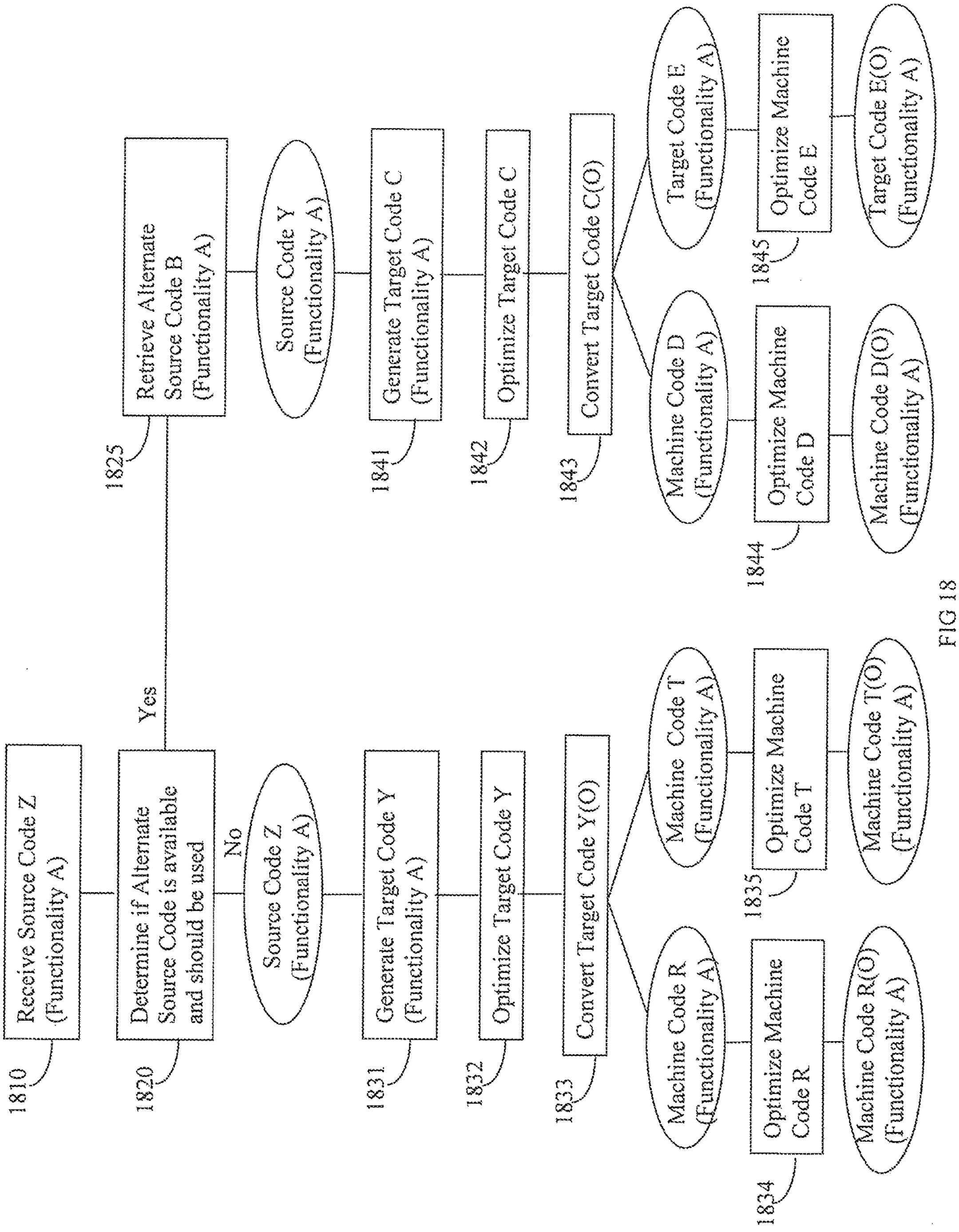
FIG. 18 is a block diagram of exemplary conversion and optimization in accordance with one embodiment of the present invention.

FIG. 18 is a block diagram of exemplary conversion and optimization at various levels in accordance with one embodiment of the present invention. In block 1801 source code Z for implementing functionality A is received. A first optimization is performed at the source code level. In one embodiment, the optimization at the source code level includes determining in block 1820 if an alternate source code for implementing functionality A that is more efficient is available. If an alternate source code B that implements functionality A more efficiently is available, the process proceeds to block 1825. If an alternate source code that implements functionality A more efficiently is not available, source code Z is used to generate target code Y in block 1831 which is optimized in block 1832 into target code Y(O). Target code Y(O) is converted in block 1833 into native machine instructions R. Native machine instructions R implements functionality A which is duplicated by native machine instructions T. Native machine instructions R is optimized in block 1834 to produce native machine instructions R(O). It is appreciated that conversion between language layers and optimization can be combined (e.g., blocks 131 and 132 can be combined, blocks 1833 and 1834 can be combined, etc.). Native machine instructions T is optimized in block 1835 to produce machine instructions T(O). The native machine instructions R(O) and T(O) can be speculatively executed as part of a reliability enhancement fault checking process.

If alternate source code is available that implements functionality A is more efficiently, the process proceeds to block 1825 in which source code B is used to generate target code C in block 1841 which is optimized in block 1842 and converted in block 1843 into native machine instructions D. Native machine instructions D implements functionality A which is duplicated by native machine instructions E. Native machine instructions D is optimized in block 1844 to produce native machine instructions D(O). Native machine instructions E is optimized in block 1845 to produce native machine instructions E(O). The native machine instructions D(O) and E(O) can be speculatively executed as part of a reliability enhancement fault checking process.

It is appreciated the optimizations can be directed at a variety of items and are not necessarily limited to native machine instruction characteristics. The optimization may be directed to pipelines with different characteristics. With reference back to FIGS. 16 and 17, in one embodiment pipeline Z is faster than pipeline A and an optimization may be selected to utilize faster pipeline Z (in FIG. 17) rather than pipeline A (in FIG. 16). In one exemplary implementation, the pipeline A uses less power than pipeline Z and pipeline A is selected as part of an optimization to conserver power.

Figure 20:
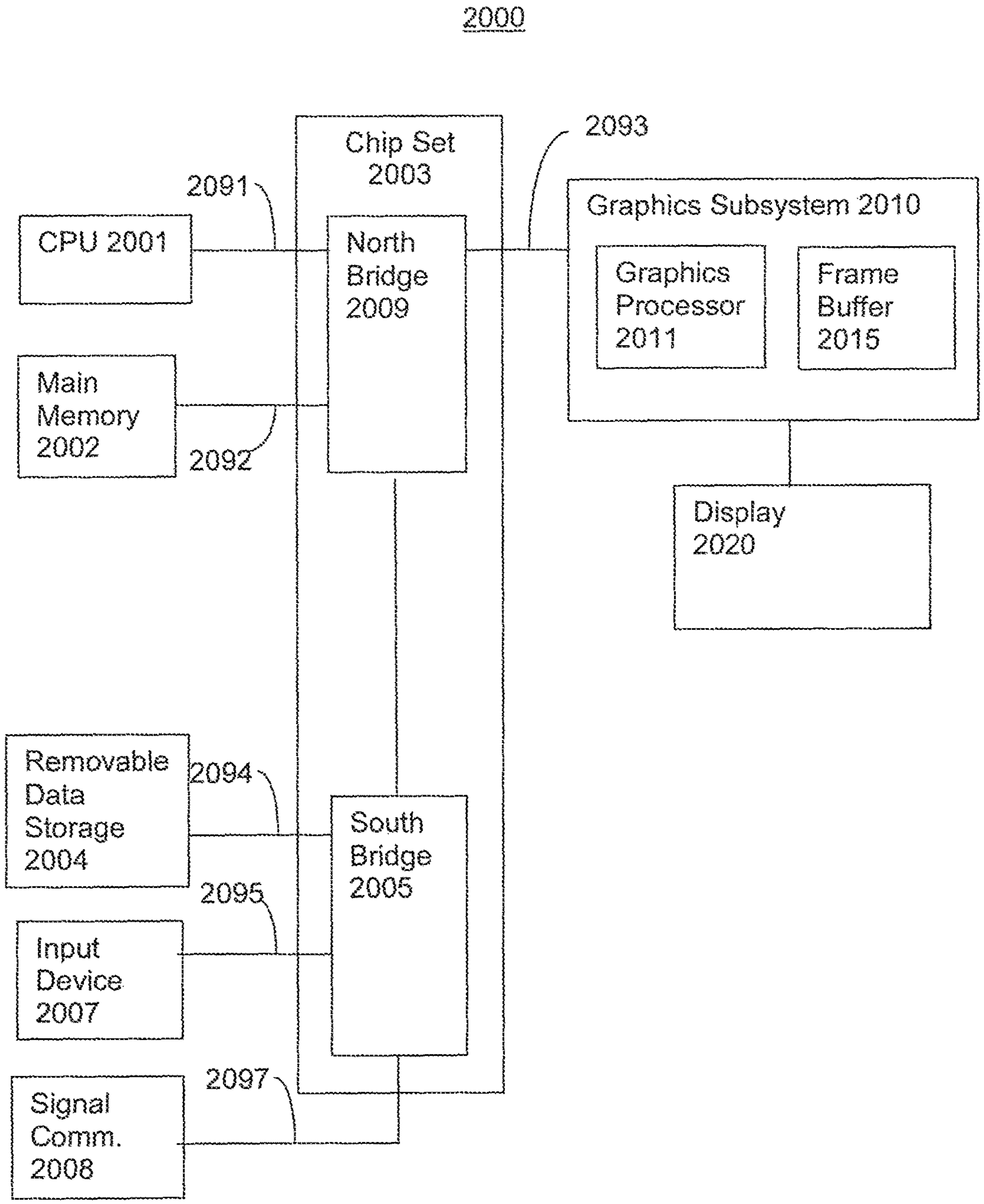
FIG. 20 is a block diagram of an exemplary computer system in accordance with one embodiment.

With reference to FIG. 20, a block diagram of an exemplary computer system 2000 is shown, one embodiment of a computer system upon which embodiments of the present invention can be implemented. Computer system 2000 includes central processor unit (CPU) 2001, main memory 2002 (e.g., random access memory), chip set 2003 with north bridge 2009 and south bridge 2005, removable data storage device 2004, input device 2007, signal communications port 2008, and graphics subsystem 2010 which is coupled to display 2020. Computer system 2000 includes several busses for communicatively coupling the components of computer system 2000. Communication bus 2091 (e.g., a front side bus) couples north bridge 2009 of chipset 2003 to central processor unit 2001. Communication bus 2092 (e.g., a main memory bus) couples north bridge 2009 of chipset 2003 to main memory 2002. Communication bus 2093 (e.g., the Advanced Graphics Port interface, Peripheral Component Interconnect (PCI) Express bus, etc.) couples north bridge of chipset 2003 to graphic subsystem 2010. Communication buses 2094, 2095 and 2097 (e.g., a PCIe bus, etc.) couples south bridge 2005 of chip set 2003 to removable data storage device 2004, input device 2007, signal communications port 2008 respectively. Graphics subsystem 2010 includes graphics processor unit (GPU) 2011 and frame buffer 2015.

The components of computer system 2000 cooperatively operate to provide versatile functionality and performance. In one exemplary implementation, the components of computer system 2000 cooperatively operate to provide predetermined types of functionality. Communications bus 2091, 2092, 2093, 2094, 2095 and 2097 communicate information. Central processor 2001 processes information. Main memory 2002 stores information and instructions for the central processor 2001. Removable data storage device 2004 also stores information and instructions (e.g., functioning as a large information reservoir). Input device 2007 provides a mechanism for inputting information and/or for pointing to or highlighting information on display 2020. Signal communication port 2008 provides a communication interface to exterior devices (e.g., an interface with a network). Display device 2020 displays information in accordance with data stored in frame buffer 2015. Graphics processor 2011 processes graphics commands from central processor 2001 and provides the resulting data to video buffers 2015 for storage and retrieval by display monitor 2020. Reliability enhancement fault checking speculative execution and error mitigation can be utilized for various operations within computer system 2000 (e.g., for execution operations on CPU 2001, execution operations on GPU 2011, etc.).

Variety of Applications.

The reliability enhancement can be utilized in a variety of applications, including safety applications, medical applications, automated guidance and control (e.g., for automobiles, avionics, ships, etc.), financial applications, and so on. If a reliability error occurs and is undetected in traditional implementations of the application there can be extremely detrimental results (e.g., a pedestrian is hit by a self driving car, medical equipment malfunctions, financial transactions lose money, etc.). A reliability enhancement speculative execution can facilitate correcting or mitigating errors. While many of the examples indicate the safe mode involves a corrective process such as rollback or ECC, it is appreciated that other actions may be taken. An error mitigation safe mode can be based upon the application. In one exemplary implementation, a self driving or automated pilot application safe mode can include turning the vehicle back over to human control or automatically stopping the vehicle. In one embodiment, a warning is sent to notify a user, such as issue alert to potential danger, request manual response (e.g., manually take over vehicle operation, manually double check the results, etc.), and so on. In one exemplary implementation, the safe mode may include initiating an automated corrected response such as automatically initiating an interrupt or branch to particular process handler, automatically starting a vehicle self stopping or parking procedure, automatically initiating a suspension of interactions (e.g., dispensing medication, financial transactions, etc.), and so on.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in flowcharts of the figures herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:

a processor configured to execute program instructions and incident thereto to perform reliability enhancement operations, wherein the reliability enhancement operations comprise:

identifying functionality of a particular portion of the program instructions;

speculatively executing multiple sets of operations contemporaneously, wherein the multiple sets of operations are functional duplicates of the particular portion of the program instructions, to generate at least a first result and a second result;

comparing speculative execution results from the multiple sets of operations to generate a comparison of the first result against the second result to produce a comparison result; and performing an error mitigation operation in response to a comparison mismatch in execution results of the comparison result; and a memory configured to store information for the processor.

2. The system of claim 1, wherein the reliability enhancement operations further comprise making the execution results architecturally visible if the execution results from the multiple sets of operations have a matching value.

3. The system of claim 1, wherein the error mitigation operation comprises a corrective procedure.

4. The system of claim 3, wherein the error mitigation operation comprises a rollback to a known valid state.

5. The system of claim 1, wherein the multiple sets of operations correspond to multiple sets of native machine instructions.

6. The system of claim 5, further comprises a conversion component configured to convert non-native instructions into the multiple sets of native machine instructions.

7. The system of claim 6, wherein the conversion component converts ARM architectural code corresponding to the particular portion of the program instructions into the multiple sets of native machine instructions.

8. The system of claim 6, wherein the conversion component converts RISC architectural code corresponding to the particular portion of the program instructions into the multiple sets of native machine instructions.

9. The system of claim 6, wherein the conversion component converts X86 architectural code corresponding to the particular portion of the program instructions into the multiple sets of native machine instructions.

10. The system of claim 6, wherein the conversion component converts CISC architectural code corresponding to the particular portion of the program instructions into the multiple sets of native instructions.

11. The system of claim 6, wherein the conversion component converts GPU shader assembly code corresponding to the particular portion of the program instructions into the multiple sets of native instructions.

12. The system of claim 6, wherein the multiple sets of native instructions are optimized.

13. The system of claim 1, wherein input values to stores are compared.

14. The system of claim 1, wherein the processor is a central processing unit (CPU).

15. The system of claim 1, wherein the processor is a graphics processing unit (GPU).

16. A method of reliability enhancement, said method comprising:

performing an instruction parsing process, comprising determining a functionality associated with program instructions;

executing the program instructions and incident to executing the program instructions performing fault checking, wherein the fault checking comprises:

speculatively executing multiple sets of operations contemporaneously, wherein the multiple sets of operations are functional duplicates of the program instructions; and comparing results from the speculative execution; and performing error mitigation based on a mismatch result from the comparison, wherein the fault checking further comprises:

storing an initial storage value from a first register to a first storage location;

loading a return storage value back from the first storage location, wherein the return storage value is loaded in a second register;

comparing the initial storage value in the first register and the return storage value in the second register; and performing additional error mitigation based on a mismatch in the initial storage value in the first register and the return storage value in the second register.

17. The method of reliability enhancement of claim 16, wherein the results are made architecturally visible if the comparing matches.

18. The method of reliability enhancement of claim 16, wherein the error mitigation comprises correcting errors.

19. The method of reliability enhancement of claim 16, wherein said fault checking further comprises committing said results if the comparing matches and rolling back to a known valid state if the comparing does not match.

20. The method of reliability enhancement of claim 16, further comprising preparing native machine instructions for execution.

21. The method of reliability enhancement of claim 16, wherein the fault checking further comprises fault checking load and storage paths.

22. The method of reliability enhancement of claim 16, wherein the comparing further comprises comparing results of load operations associated with the particular code portion.

23. The method of reliability enhancement of claim 16, wherein values that are made architecturally visible are stored and wherein the fault checking further comprises checking storage.

24. The method of reliability enhancement of claim 16, wherein the comparing further comprises comparing input branch values.

25. A computer readable medium with instructions encoded thereon that when executed by a processor perform:

conversion and optimization of a particular code portion to produce native machine instructions, wherein the native machine instructions are functional duplicates of the particular code portion, corresponding to at least a first result and a second result;

self checking contemporaneous speculative execution of the native machine instructions of the first result and second result to produce a comparison result; and error mitigation based upon the self-checking speculative execution of the comparison result.

26. The computer readable medium of claim 25, wherein the conversion and optimization of a particular code portion comprises creating multiple instruction streams of the native machine instructions.

27. The computer readable medium of claim 26, wherein the self-checking speculative execution includes:

speculatively executing the multiple instruction streams contemporaneously; and comparing results of the multiple instruction streams of code portions.

28. The computer readable medium of claim 27, wherein the error mitigation is performed responsive to a mismatch in the comparing.

29. The computer readable medium of claim 25, wherein the conversion and optimization of a particular code portion produces multiple sets of native machine instructions that are functional duplicates of the particular code portion.

30. A method of executing a program, said method comprising:

converting said program comprising instructions of a high level language into a plurality of instructions that are native to a processor, said plurality of instructions for execution on said processor, wherein a portion of said program is converted into a first code portion of native machine instructions and a second code portion of native machine instructions;

wherein said first code portion and said second code portion are functionally equivalent to each other and functionality equivalent to said portion of said program;

said processor speculatively executing said first code portion and said second code portion to generate respective first results and second results;

comparing said first results against said second results to produce a comparison result; and performing an error mitigation process responsive to a mismatch within said comparison result.

31. The method as described in claim 30 wherein said performing an error mitigation process comprises said processor rolling back to a last known commit point of said execution of said plurality of instructions.

32. The method as described in claim 30 wherein said processor is an in-order execution microprocessor.

33. The method as described in claim 30 wherein said processor is an out-of-order execution microprocessor.

34. The method as described in claim 30 wherein said processor comprises a plurality of execution units and wherein further said processor speculatively executing said first code portion and said second code portion to generate respective first results and second results comprises execution units of said plurality of execution units operating in parallel to execute said first code portion and said second code portion while said processor is set in a speculative execution mode.

35. The method as described in claim 30 further comprising said processor making said results architecturally visible responsive to a match of said comparison result.

36. The method as described in claim 30 wherein said performing an error mitigation process comprises said processor generating a fault condition.

37. The method as described in claim 30 wherein said portion of said plurality of instructions is a reliability critical portion of said program.

38. The method as described in claim 30 further comprising optimizing said first code portion and said second code portion for execution on said processor.

39. The method as described in claim 30 wherein said converting comprises automatically determining said portion of said plurality of instructions.

40. The method as described in claim 30 wherein said processor speculatively executing said first code portion and said second code portion to generate respective first results and second results comprises said processor substantially contemporaneously speculatively executing said first code portion and said second code portion to generate respective first results and second results.

41. The method as described in claim 30 wherein said converting is performed by a binary translation system.

42. The method as described in claim 30 wherein said converting is performed by a GPU.

43. The method as described in claim 30 wherein said converting is performed by an in order processor.

44. The method as described in claim 30 wherein said converting is performed by a shader processing component.

* * * * *

UNITED STATES PATENT AND TRADEMARK OFFICE

CERTIFICATE OF CORRECTION

PATENT NO. : 10,289,469 B2
APPLICATION NO. : 15/338247
DATED : May 14, 2019
INVENTOR(S) : Nick Fortino, Fred Gruner and Ben Hertzberg It is certified that error appears in the above-identified patent and that said Letters Patent is hereby corrected as shown below:

In the Specification

In Column 9, Line 9, after --511A and-- delete "511E" and insert --511B--

Signed and Sealed this
Thirtieth Day of July, 2019

Andrei Iancu
*Director of the United States Patent and Trademark Office*